United States Patent
Ashman et al.

(10) Patent No.: US 12,488,554 B2
(45) Date of Patent: Dec. 2, 2025

(54) SYSTEM AND METHOD FOR REAL-TIME ADAPITIVE RESOLUTION MICROSCOPE SLIDE IMAGING

(71) Applicant: The Administrators of the Tulane Educational Fund, New Orleans, LA (US)

(72) Inventors: Kimberly Lorain Ashman, New Orleans, LA (US); Jonathon Quincy Brown, New Orleans, LA (US); Cody Maurice Licorish, New Orleans, LA (US); Brian Mark Summa, New Orleans, LA (US); Carola Wenk, New Orleans, LA (US); Huimin Zhuge, New Orleans, LA (US); Max Sebastian Cooper, New Orleans, LA (US)

(73) Assignee: The Administrators of the Tulane Educational Fund, New Orleans, LA (US)

( * ) Notice: Subject to any disclaimer, the term of this patent is extended or adjusted under 35 U.S.C. 154(b) by 269 days.

(21) Appl. No.: 18/279,171

(22) PCT Filed: Mar. 4, 2022

(86) PCT No.: PCT/US2022/019019
§ 371 (c)(1),
(2) Date: Aug. 28, 2023

(87) PCT Pub. No.: WO2022/187703
PCT Pub. Date: Sep. 9, 2022

(65) Prior Publication Data
US 2024/0303952 A1 Sep. 12, 2024

Related U.S. Application Data

(60) Provisional application No. 63/157,244, filed on Mar. 5, 2021.

(51) Int. Cl.
*G06V 10/10* (2022.01)
*G02B 21/00* (2006.01)
*G02B 21/36* (2006.01)
*G06V 10/98* (2022.01)
(Continued)

(52) U.S. Cl.
CPC ......... *G06V 10/16* (2022.01); *G02B 21/0036* (2013.01); *G02B 21/008* (2013.01);
(Continued)

(58) Field of Classification Search
CPC .... G06V 10/16; G06V 10/993; G06V 20/698; G06V 20/693; G02B 21/0036;
(Continued)

(56) References Cited

U.S. PATENT DOCUMENTS 5,394,268 A * 2/1995 Lanni ..................... G02B 21/06
359/368
6,055,097 A 4/2000 Lanni et al.
(Continued)

FOREIGN PATENT DOCUMENTS

EP 2740104 B1 * 12/2016 ............. G06T 11/60

OTHER PUBLICATIONS

Extended European Search Report issued in Application No. 22764191. 7, dated Jan. 7, 2025.
(Continued)

*Primary Examiner* — Philip P. Dang
(74) *Attorney, Agent, or Firm* — Amster, Rothstein & Ebenstein LLP

(57) ABSTRACT

The present invention provides a system and method for capturing images during review of a microscope slide. In certain embodiments, such system and method allow for the capture of images and construction of a composited microscope mosaic image within the workflow of the slide reviewer, such as a pathologist reviewing a tissue sample. In certain embodiments, said mosaic images are whole slide images constructed by and capable of being viewed at (Continued)

variable resolutions and magnifications corresponding to the review of the original microscope slide by the slide reviewer.

29 Claims, 26 Drawing Sheets

(51) Int. Cl.
    *G06V 20/69*      (2022.01)
    *H04N 5/262*      (2006.01)

(52) U.S. Cl.
    CPC ......... *G02B 21/361* (2013.01); *G02B 21/367* (2013.01); *G06V 10/993* (2022.01); *G06V 20/698* (2022.01); *H04N 5/2624* (2013.01)

(58) Field of Classification Search
    CPC .. G02B 21/008; G02B 21/361; G02B 21/367; G06T 3/04; G06T 3/4038
    See application file for complete search history.

(56) References Cited

U.S. PATENT DOCUMENTS

| | | | | |
|---|---|---|---|---|
| 6,272,235 | B1 * | 8/2001 | Bacus | G01N 15/1433 |
| | | | | 382/172 |
| 7,456,377 | B2 * | 11/2008 | Zeineh | G02B 21/365 |
| | | | | 250/201.3 |
| 7,826,649 | B2 * | 11/2010 | Crandall | H04N 1/193 |
| | | | | 382/128 |
| 7,863,552 | B2 * | 1/2011 | Cartlidge | G06T 3/10 |
| | | | | 359/368 |
| 8,830,313 | B2 * | 9/2014 | Narusawa | G02B 21/241 |
| | | | | 348/79 |
| 9,516,223 | B2 * | 12/2016 | Zhou | H04N 23/698 |
| 10,634,894 | B2 * | 4/2020 | Zou | G03B 13/36 |
| 11,747,603 | B2 * | 9/2023 | Shaffer | G02B 21/008 |
| | | | | 348/79 |
| 11,816,832 | B2 * | 11/2023 | Tang | G06T 11/005 |
| 12,259,541 | B2 * | 3/2025 | Yang | G02B 21/367 |
| 2005/0254696 | A1 | 11/2005 | Bacus et al. | |
| 2013/0329072 | A1 | 12/2013 | Zhou et al. | |
| 2014/0270537 | A1 | 9/2014 | Lo et al. | |
| 2020/0162696 | A1 | 5/2020 | Kühm et al. | |
| 2024/0303952 | A1 * | 9/2024 | Ashman | G06V 10/993 |

OTHER PUBLICATIONS

International Search Report and Written Opinion issued in PCT/US2022/019019, mailed Aug. 1, 2022.

* cited by examiner b. Resolution maps (combined and per lens)
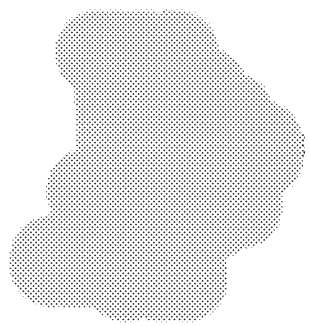 2x  FIG. 7A
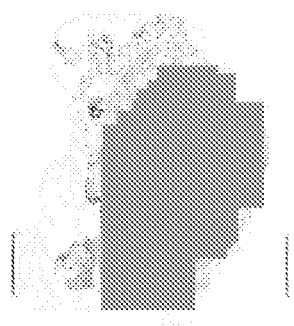 4x  FIG. 7B
 10x  FIG. 7C
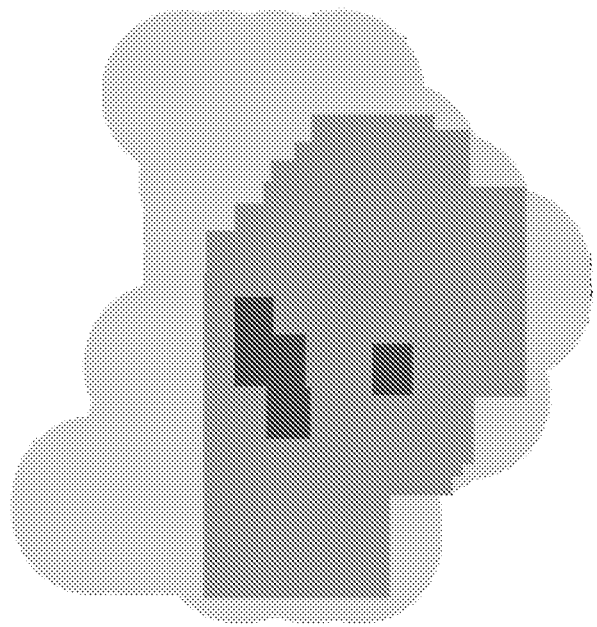
*Coverage for all lenses combined*
FIG. 7

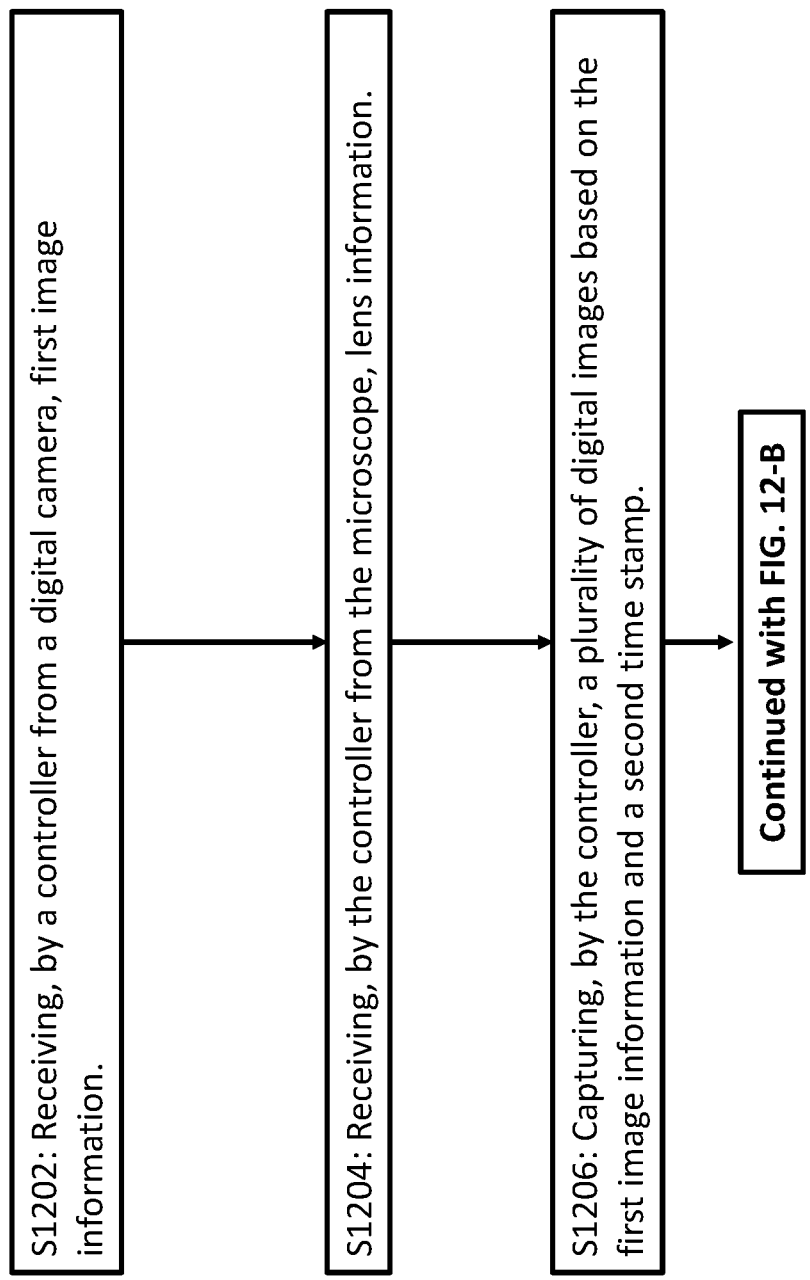

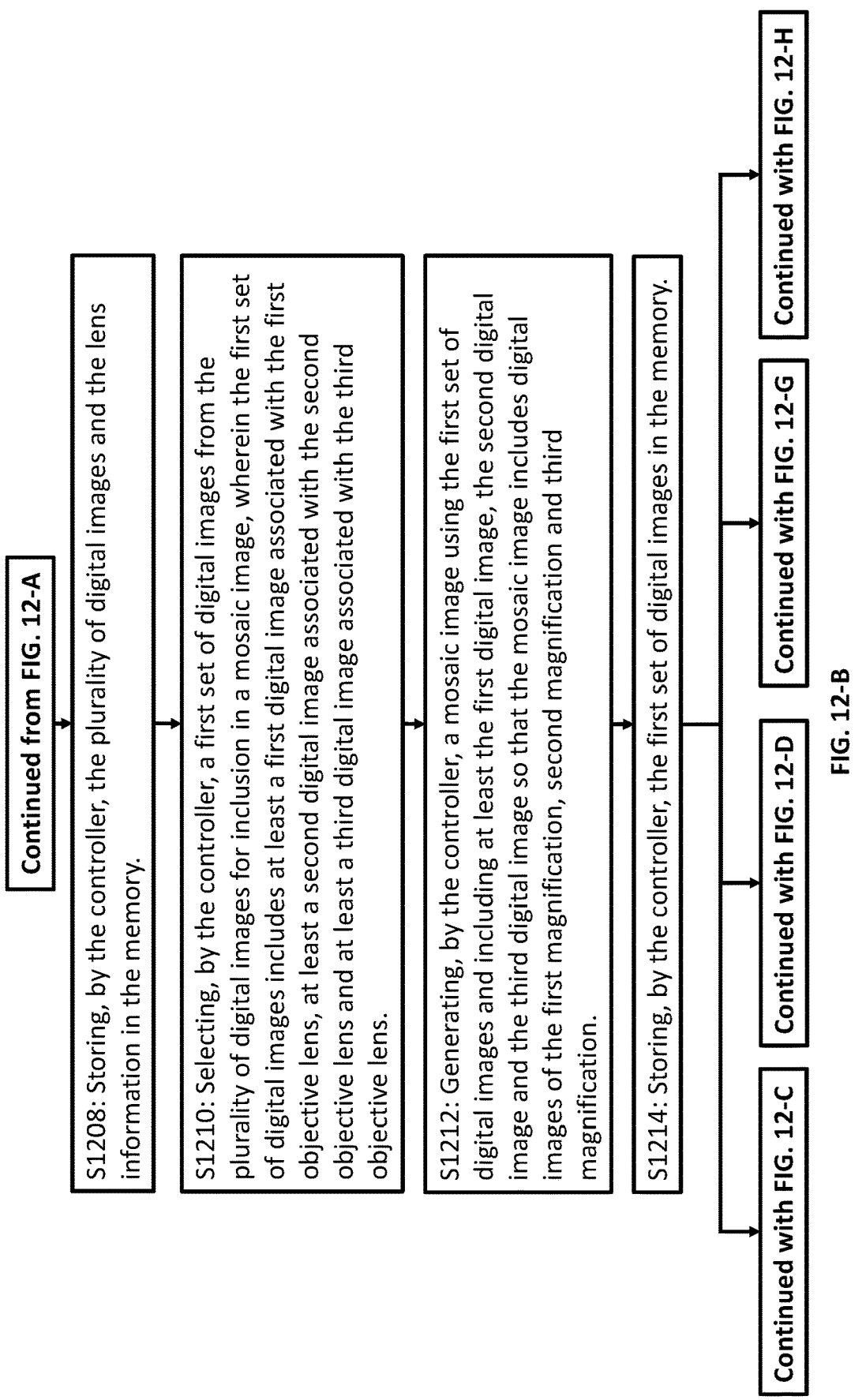

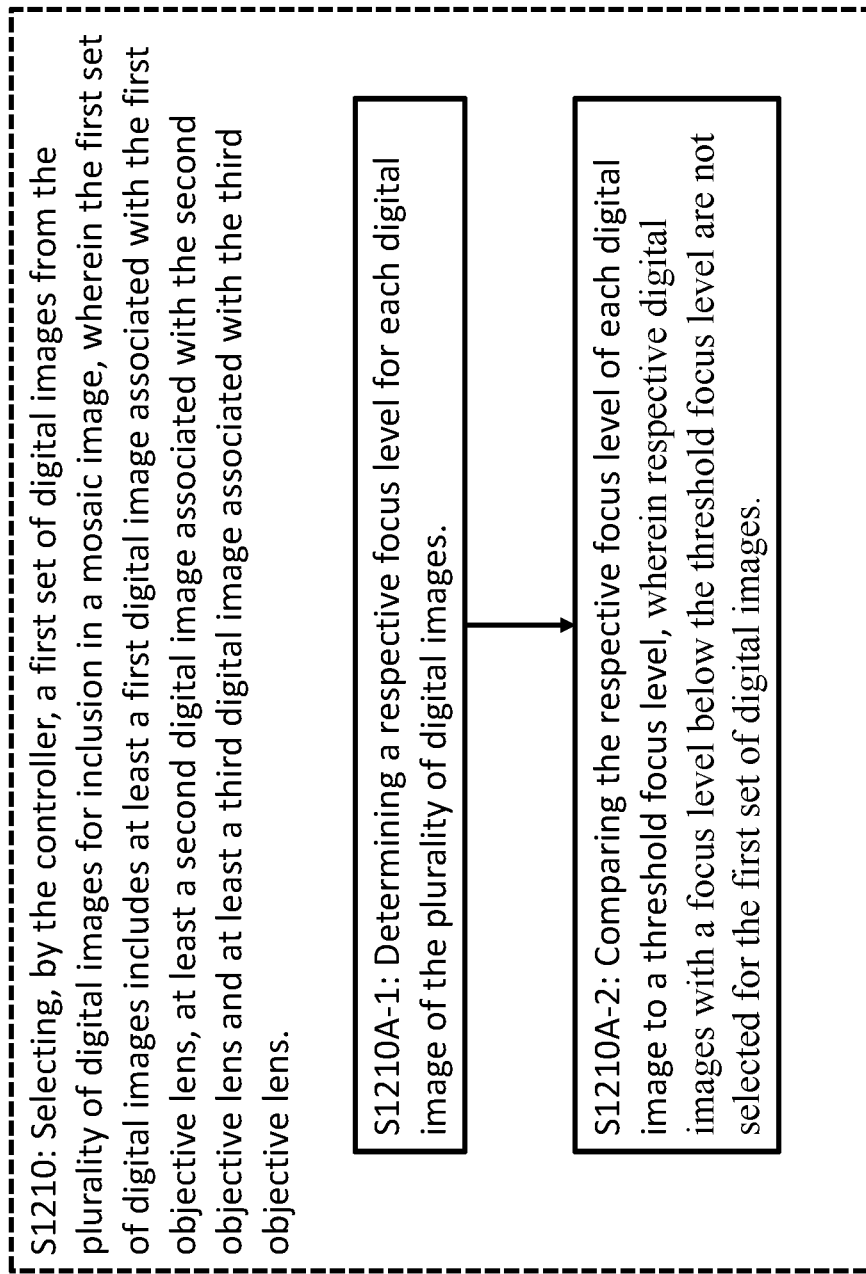
FIG. 12-B1

S1210: Selecting, by the controller, a first set of digital images from the plurality of digital images for inclusion in a mosaic image, wherein the first set of digital images includes at least a first digital image associated with the first objective lens, at least a second digital image associated with the second objective lens and at least a third digital image associated with the third objective lens.

S1210B: Identifying keyfeatures in each digital image of the plurality of images wherein respective digital images with fewer than a threshold number of keyfeatures are determined to be of poor quality and are not selected for the first set of digital images.

FIG. 12-B2

S1212: Generating, by the controller, a mosaic image using the first set of digital images and including at least the first digital image, the second digital image and the third digital image so that the mosaic image includes digital images of the first magnification, second magnification and third magnification.

S1212A: Generating a whole or partial mosaic slide image.

FIG. 12-B3

S1212: Generating, by the controller, a mosaic image using the first set of digital images and including at least the first digital image, the second digital image and the third digital image so that the mosaic image includes digital images of the first magnification, second magnification and third magnification.

S1212B: Matching at least the first digital image and at least one of the second digital image and the third digital image using a matching algorithm.

FIG. 12-B4

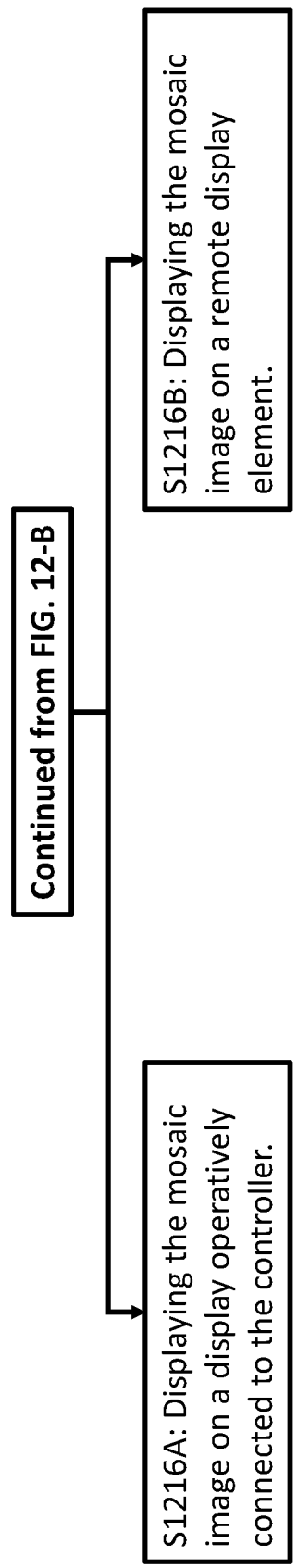
FIG. 12-C
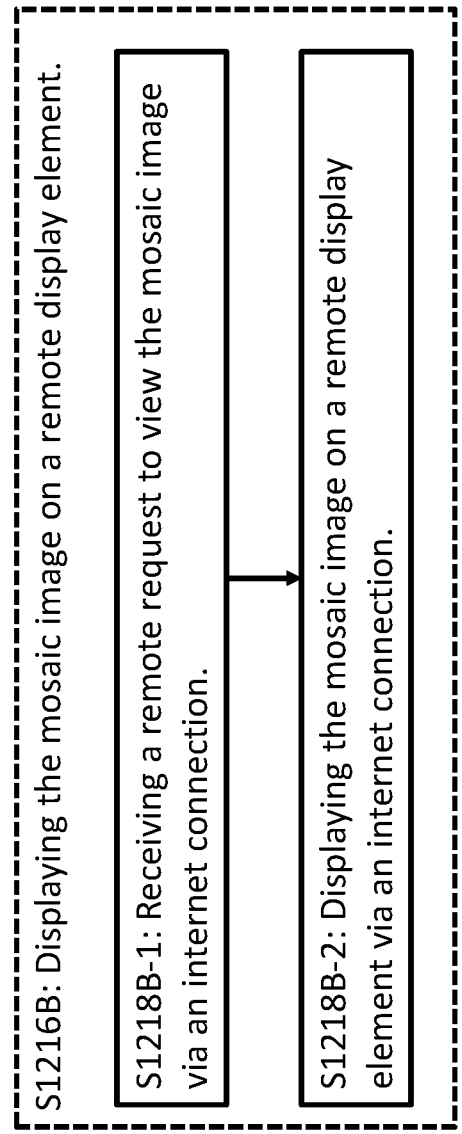
FIG. 12-C1

Continued from FIG. 12-B → S1216C: Storing, by the controller, first image information and lens information for all digital images of the plurality of digital images.

FIG. 12-D

Continued from FIG. 12-B → S1216D: Generating, by the controller, path information indicating a path of the first objective lens, second objective lens and third objective lens across the microscope slide during the review.

FIG. 12-E

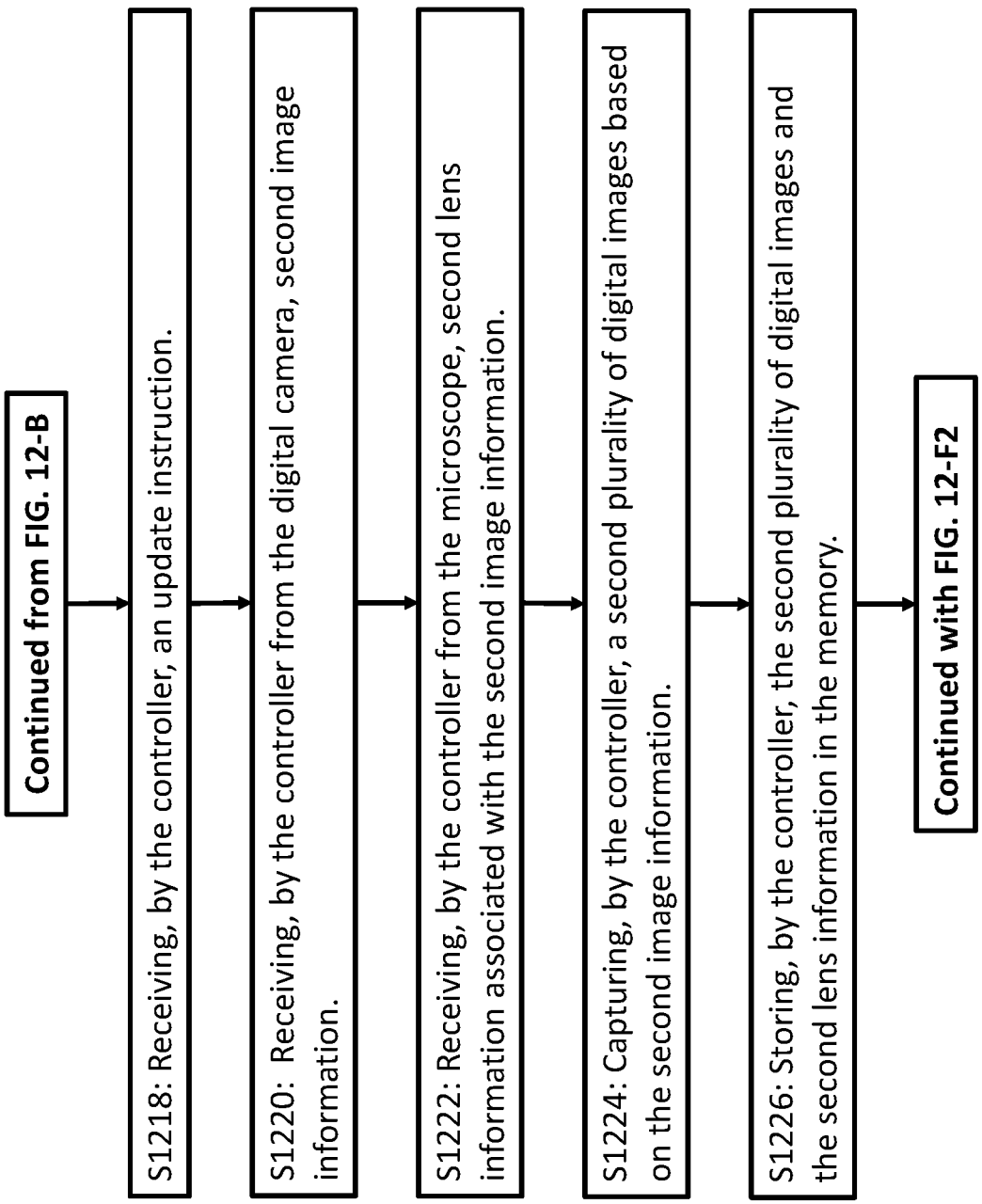
FIG. 12-F1

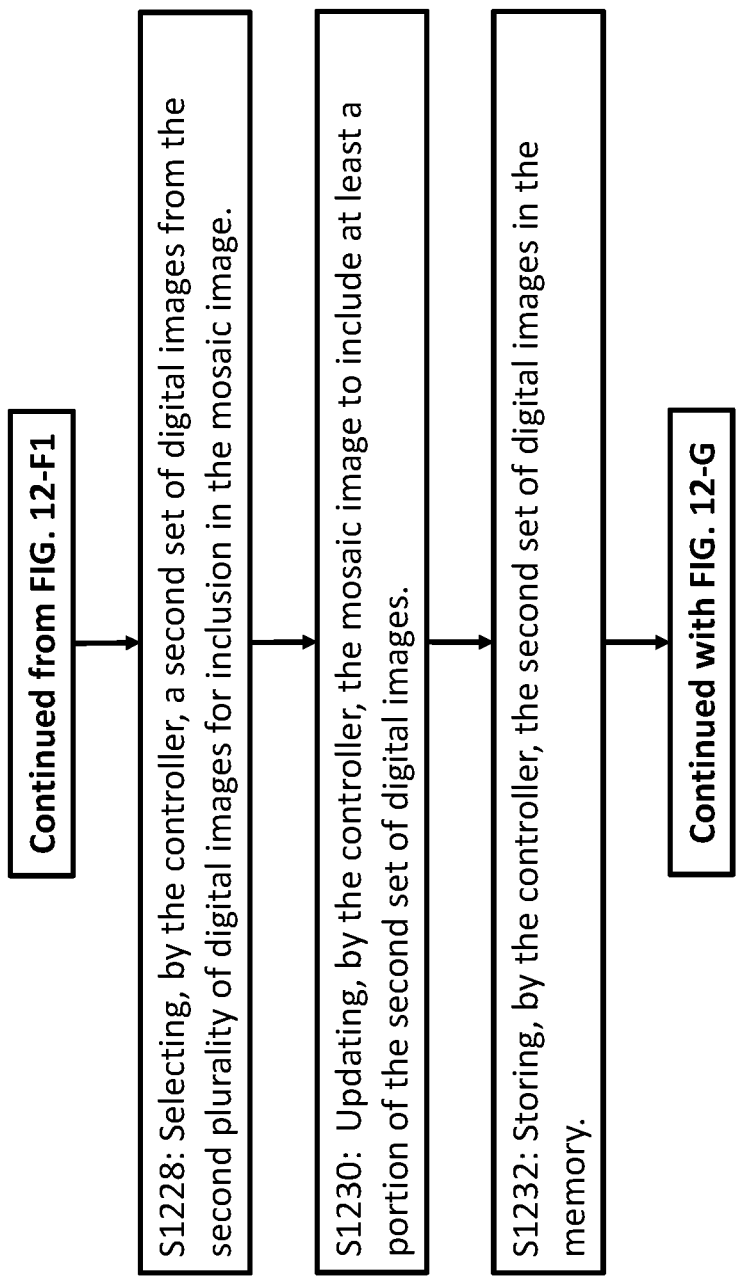
FIG. 12-F2

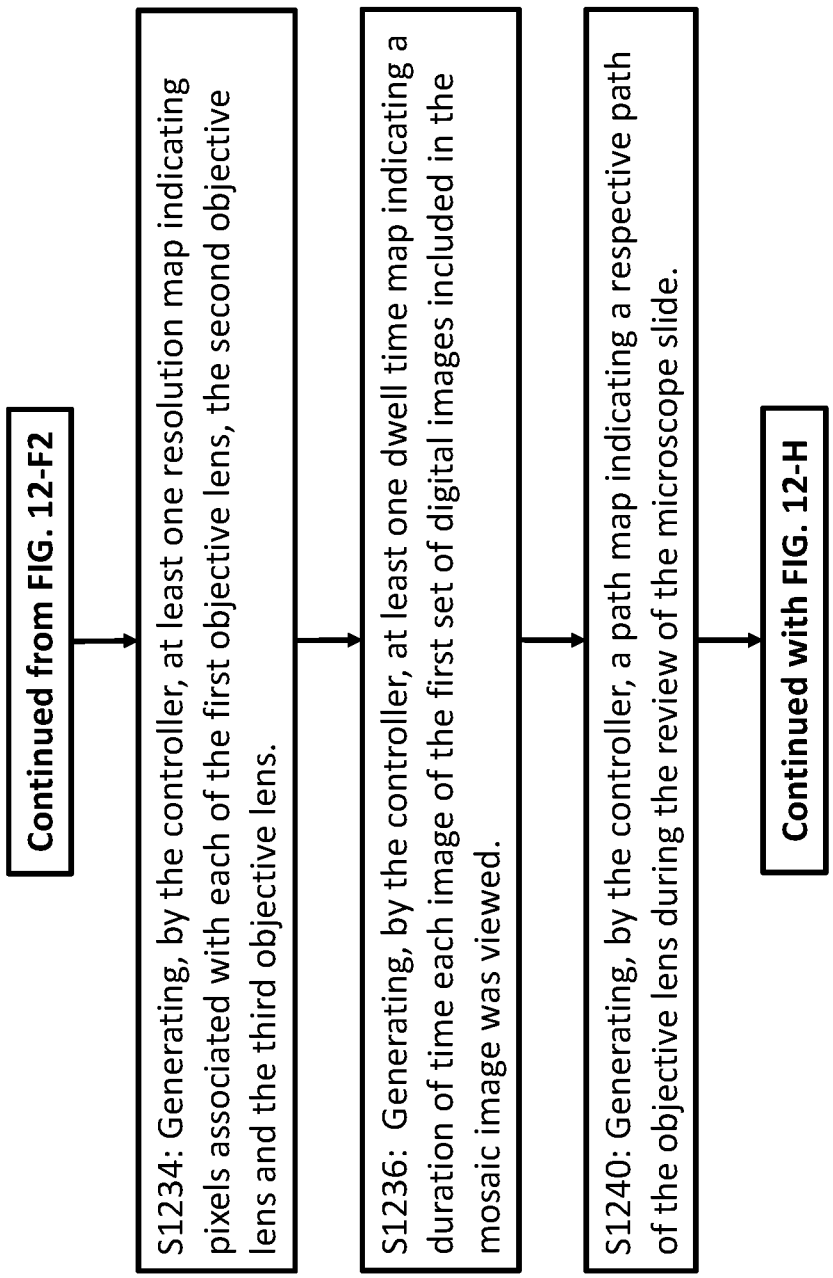
FIG. 12-G

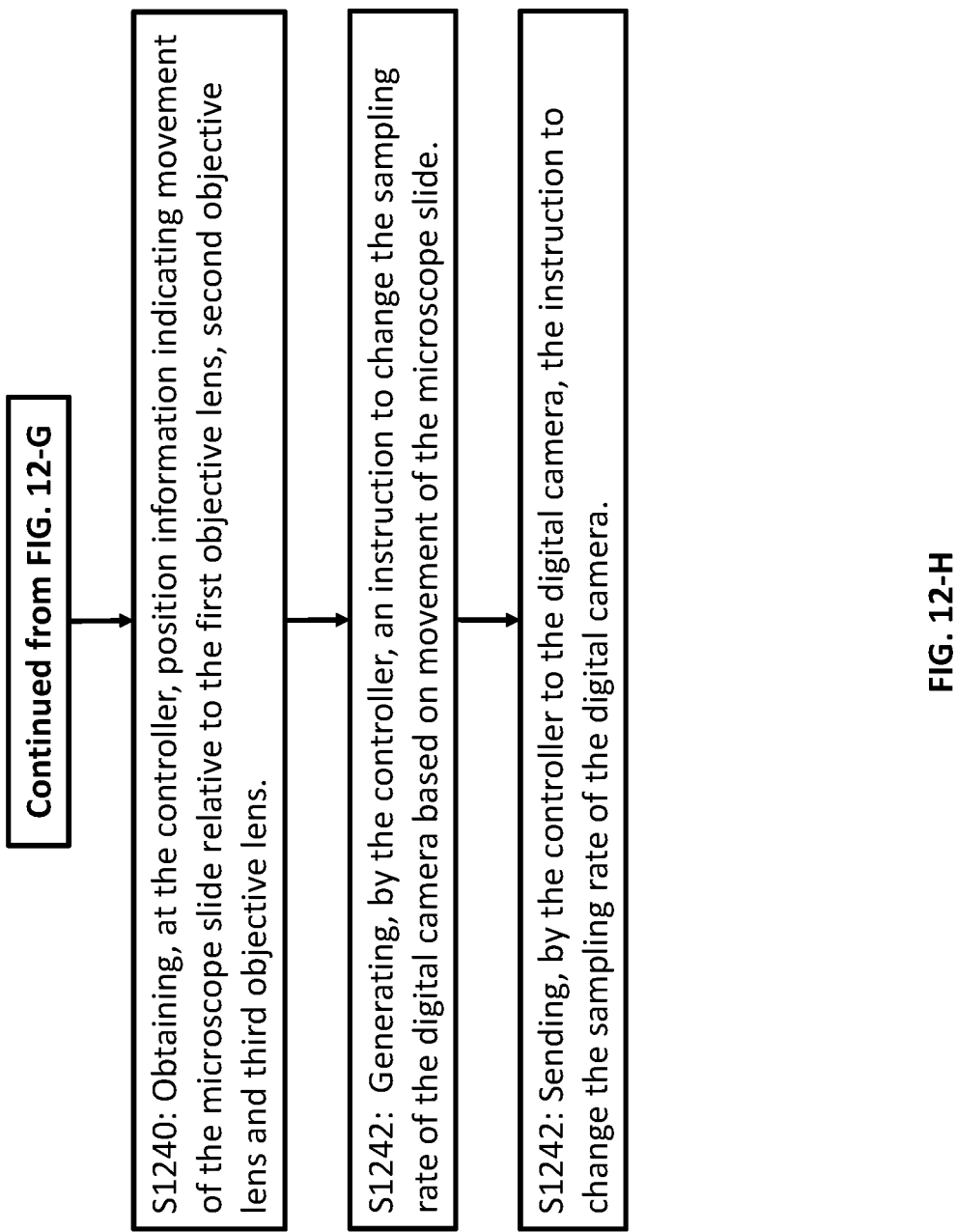
FIG. 12-H

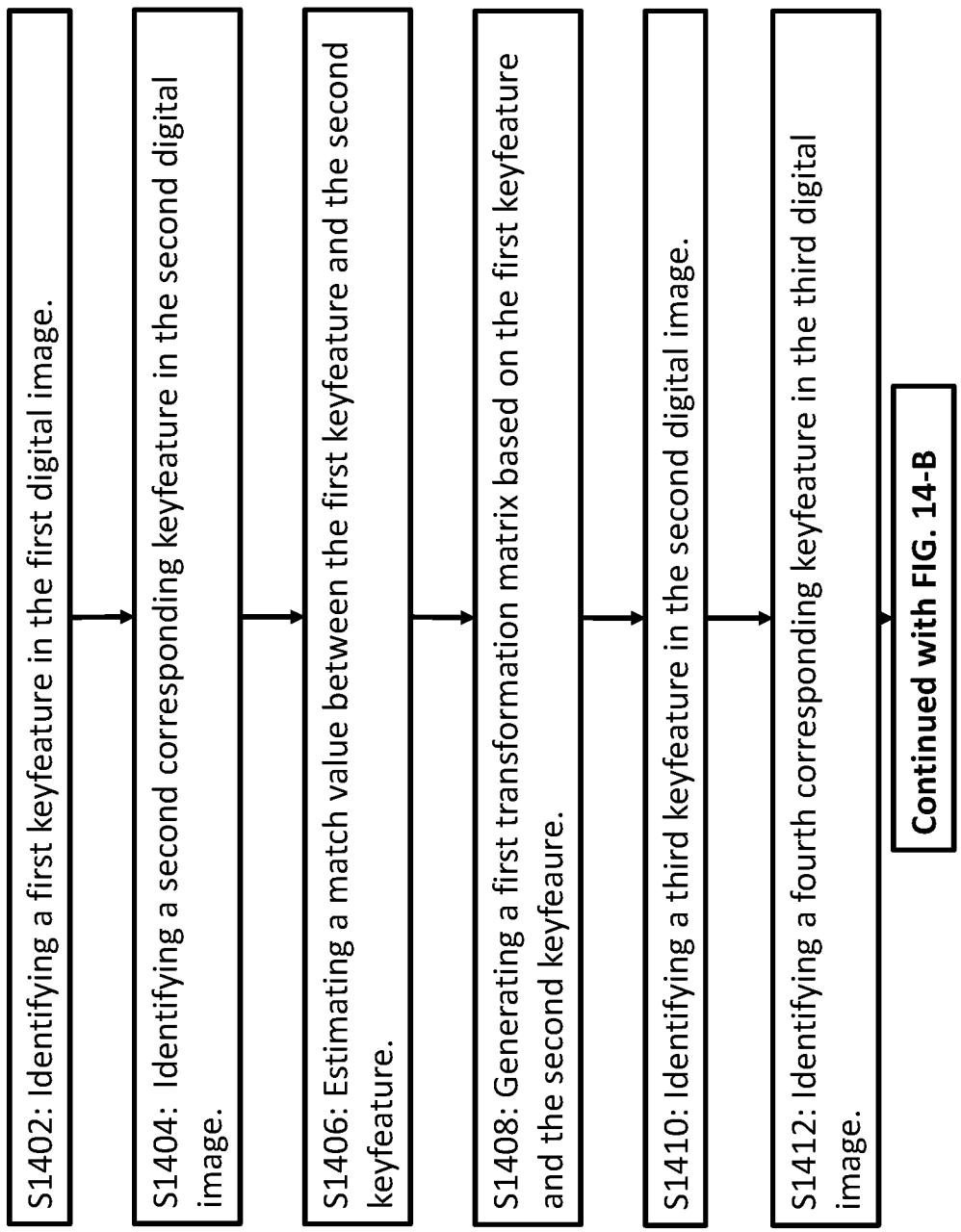
FIG. 14-A

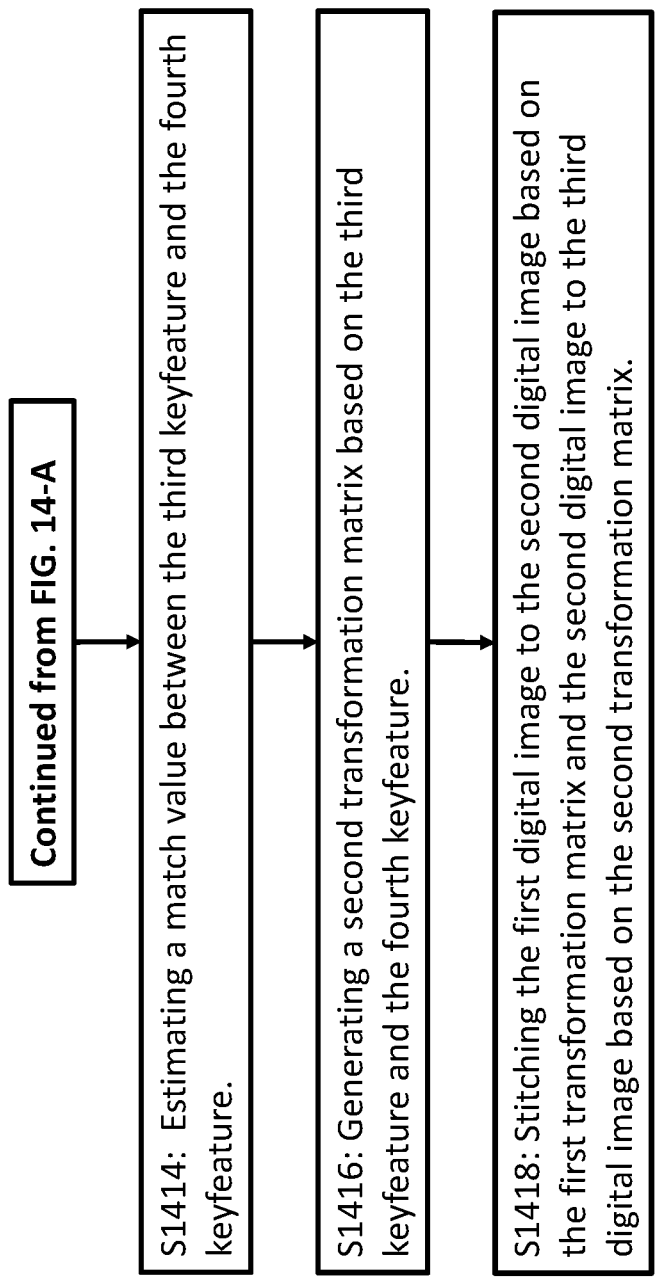
FIG. 14-B

SYSTEM AND METHOD FOR REAL-TIME ADAPITIVE RESOLUTION MICROSCOPE SLIDE IMAGING

CROSS-REFERENCE TO RELATED APPLICATIONS

This application is a U.S. national stage entry under 35 U.S.C. § 371 of PCT International Patent Application No. PCT/US2022/019019, filed Mar. 4, 2022, which claims priority to U.S. Patent Application Ser. No. 63/157,244, filed on Mar. 5, 2021, and entitled "SYSTEM AND METHOD FOR REAL-TIME ADAPTIVE RESOLUTION MICROSCOPE SLIDE IMAGING", the entire content of which is hereby incorporated by reference as if fully set forth herein.

STATEMENT OF FEDERAL FUNDING

This invention was made with government support under Award Number 1664848 awarded by the National Science Foundation—Division of Mathematical Sciences, Award Number 1657020 awarded by the National Science Foundation—Division of Information & Intelligent Systems, Award Number 1144646 awarded by the National Science Foundation—Division of Graduate Education, and Award Number R01CA222831 awarded by the National Institutes of Health. The government has certain rights in the invention.

FIELD OF THE INVENTION

The present invention generally relates to microscope slide imaging and more specifically to systems and methods for real-time imaging, video mosaicking, and variable resolution mosaic creation, storage, and visualization of microscope slides.

BACKGROUND OF THE INVENTION

Whole slide imaging systems that create digital images of tissue sections have opened the possibilities of digital telepathology, the use of computer-assisted algorithms to enhance diagnosis and prognosis, and digital pathomics—the discovery of new imaging biomarkers from digital histopathology images of diseased biospecimens that may have unique diagnostic, prognostic, and predictive capabilities beyond those already established using subjective human analysis. The development of such image biomarkers hinges on the availability of large image datasets from large numbers of patients, to which a variety of techniques may be applied to search for the biomarkers. However, there is currently a barrier to progress in the field of digital pathology and digital pathomics.

Acquisition of digital pathology images is currently outside of the clinical pathology workflow, limiting its adoption and stunting progress in digital pathomics research and applications. Most current research in the digital pathology field is focused on post hoc analysis of whole slide images that are acquired using dedicated slide scanners after the clinical review. Digital slide scanning adds additional steps to the pathology workflow. These steps include managing the slide scanning process by checking slide quality and rescanning unfocused slides. Due to the time it takes to scan each slide, which can be anywhere from 12 seconds to 30 minutes, a full case of dozens of slides will generally not be available for digital review until 24 to 48 hours after preparation.

There is also expense and burden in storing high resolution, multi-gigabyte slide images. Although digital whole slide scanners (automated microscope scanners that take high resolution images of entire pathology slides) have been approved by the U.S. Food and Drug Administration for use in primary diagnostics and are increasingly available at research facilities around the world, the scanners are expensive and their use represents an additional lengthy and cumbersome step outside of the standard pathology workflow. Current technical limitations associated with these scanners has limited the adoption of this technology in clinics. As a result, the vast majority of histopathology slides generated in clinical practice are never digitized.

Thus, conventional digital pathology systems suffer from a technical problem in that they are unable to efficiently scan and digitize pathology slides to provide useful diagnostic information and or sufficiently large data sets to allow for identification of imaging biomarkers.

In addition, conventional digital whole slide scanners are not "smart" and digitize entire slides at a single resolution that does not optimize the size of the resulting data, resulting in overly large image files that contain more 'data' than clinically useful 'information'. The challenge of data storage is non-trivial, considering that each surgical pathology slide may be over 1 billion pixels. Scanning is also practically limited to a fixed 20× or 40× one-size-fits-all magnification, which is higher than necessary for regions that are irrelevant to the diagnosis. Assuming a conservative average uncompressed file size of 10 gigabytes ("GB") per 20× slide, and 1.5 million slides per year at a high-volume institution, this results in at least 15 Petabytes of data per year. Thus, another problem inherent to conventional digital pathology systems is that files related to individual digital slides contain too much data to be useful such that they needlessly increase both time and cost associated with slide scanning.

Together, these technical limitations create a conundrum: while pathology is globally under-digitized because most slides are not scanned such that there is an insufficient digital data set to identify image biomarkers that can be used in diagnosis and treatment, on a per-slide basis they are locally over-digitized and include superfluous data including that related to areas of the tissue that are not relevant to diagnosis or treatment and are captured at the highest resolution such that individual digitized slides cannot be stored efficiently.

Accordingly, it would be beneficial to provide a digital pathology system and method that avoids these and other problems.

SUMMARY OF THE INVENTION

A system for capturing images during review of a microscope slide in accordance with an embodiment of the present disclosure includes: a microscope including a stage configured to support the microscope slide, a first objective lens providing a first magnification, a second objective lens providing a second magnification, a third objective lens providing a third magnification and a lens indicator sensor, wherein the microscope slide may be movable relative to the first objective lens, the second objective lens and the third objective lens; and wherein the lens indicator sensor may be configured to provide lens information indicating whether the first objective lens, the second objective lens or the third objective lens may be in use and including a first time stamp. In embodiments, the system may also include a digital camera operably connected to the microscope and configured to provide image information associated with images provided via the first objective lens, the second objective lens and the third objective lens during review of the microscope slide, wherein the image information may include: image data and a second time stamp associated with a time at which such image data was generated by the digital camera. In embodiments, the system may also include a controller operably connected to the digital camera and the microscope, wherein the controller may include at least one processor and memory operably connected to the controller and including processor executable code that when executed performs steps of: (1) receiving, by the controller from the digital camera, the image information; (2) receiving, by the controller from the microscope, the lens information; (3) capturing, by the controller, a plurality of digital images based on the image information and the second time stamp; (4) storing, by the controller, the plurality of digital images and the lens information in the memory; (5) selecting, by the controller, a first set of digital images from the plurality of digital images for inclusion in a mosaic image, wherein the first set of digital images may include at least a first digital image associated with the first objective lens, at least a second digital image associated with the second objective lens and at least a third digital image associated with the third objective lens, wherein the selecting may be based on the image information and the lens information; (6) generating, by the controller, a mosaic image using the first set of digital images and including at least the first digital image, the second digital image and the third digital image so that the mosaic image may include digital images of the first magnification, second magnification and third magnification, wherein, the generating may include matching at least the first digital image and at least one of the second digital image and the third digital image using a matching algorithm; (7) storing, by the controller, the first set of digital images in the memory.

A system for capturing images during review of a microscope slide in accordance with another embodiment of the present disclosure includes: a microscope including a stage configured to support the microscope slide, a first objective lens providing a first magnification, a second objective lens providing a second magnification, a third objective lens providing a third magnification and a lens indicator sensor, wherein the microscope slide may be movable relative to the first objective lens, the second objective lens and the third objective lens and wherein the lens indicator sensor may be configured to provide lens information indicating whether the first objective lens, the second objective lens or the third objective lens may be in use and including a first time stamp. In embodiments, the system may include a digital camera operably connected to the microscope and configured to provide image information associated with images provided via the first objective lens, the second objective lens and the third objective lens during review of the microscope slide, wherein the image information may include image data and a second time stamp associated with a time at which such image data was generated by the digital camera, a controller operably connected to the digital camera and the microscope, wherein the controller may include at least one processor and memory operably connected to the controller. In embodiments, the memory may include processor executable code that when executed performs steps of: (1) receiving, by the controller from the digital camera, the image information; (2) receiving, by the controller from the microscope, the lens information; (3) capturing, by the controller, a plurality of digital images based on the image information and the second time stamp; (4) storing, by the controller, the plurality of digital images and the lens information in the memory; (5) selecting, by the controller, a first set of digital images from the plurality of digital images for inclusion in a first mosaic image, wherein the first set of digital images may include digital images associated with a first objective lens providing a first magnification, a second set of digital images from the plurality of digital images for inclusion in a second mosaic image, wherein the second set of digital images may include digital images associated with a second objective lens providing a second magnification, and/or a third set of digital images from the plurality of digital images for inclusion in a third mosaic image, wherein the third set of digital images may include digital images associated with a third objective lens providing a third magnification, wherein the selecting may be based on the image information and the lens information; (6) generating, by the controller, a mosaic image using the first set of digital images; (7) selecting, by the controller, a first set of digital images from the plurality of digital images for inclusion in a first mosaic image, wherein the first set of digital images may include digital images associated with a first objective lens providing a first magnification; a second set of digital images from the plurality of digital images for inclusion in a second mosaic image, wherein the second set of digital images may include digital images associated with a second objective lens providing a second magnification; and/or a third set of digital images from the plurality of digital images for inclusion in a third mosaic image, wherein the third set of digital images may include digital images associated with a third objective lens providing a third magnification, wherein the selecting may be based on the image information and the lens information; (8) generating, by the controller: the first mosaic image using the first set of digital images, the second mosaic image using the second set of digital images, the third mosaic image using the third set of digital images, and/or a fourth mosaic image based on a combination of the first mosaic image, the second mosaic image and the third mosaic image such that the fourth mosaic image may include digital images of the first magnification, second magnification and third magnification, wherein the generating may include matching a first at least one digital image of the first mosaic image and a second at least one digital image of the second mosaic image and a third at least one digital image of the third mosaic image using a matching algorithm; and/or (9) storing, by the controller, the first set of digital images, the second set of digital images, the third set of digital images and the fourth mosaic image in the memory.

A method for capturing images during review of a microscope slide during review of a microscope slide using a microscope adapted to connection to a digital camera in accordance with an embodiment of the present disclosure includes steps of: (a) receiving, by a controller from the digital camera, first image information, wherein the controller may be operably connected to the digital camera and the microscope, wherein the microscope may include a stage configured to support the microscope slide, a first objective lens providing a first magnification, a second objective lens providing a second magnification, a third objective lens providing a third magnification and a lens indicator sensor, wherein the microscope slide may be movable relative to the first objective lens, the second objective lens and the third objective lens, wherein the lens indicator sensor may be configured to provide lens information indicating whether the first objective lens, the second objective lens or the third objective lens may be in use and including a first time stamp, wherein the first image information may be associated with images provided via the first objective lens, the second objective lens and the third objective lens during review of the microscope slide, and wherein the first image information may include image data and a second time stamp associated with a time at which such image data was generated by the digital camera; (b) receiving, by the controller from the microscope, the lens information; (c) receiving, by the controller from the digital camera, the first image information; (d) capturing, by the controller, a plurality of digital images based on the first image information and the second time stamp; (e) storing, by the controller, the plurality of digital images and the lens information in the memory; (f) selecting, by the controller, a first set of digital images from the plurality of digital images for inclusion in a mosaic image, wherein the first set of digital images may include at least a first digital image associated with the first objective lens, at least a second digital image associated with the second objective lens and at least a third digital image associated with the third objective lens, wherein the selecting may be based on the first image information and the lens information; (g) generating, by the controller, a mosaic image using the first set of digital images and including at least the first digital image, the second digital image and the third digital image so that the mosaic image may include digital images of the first magnification, second magnification and third magnification, wherein the generating may include matching at least the first digital image and at least one of the second digital image and the third digital image using a matching algorithm; and/or (h) storing, by the controller, the first set of digital images in the memory.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompanying figures, wherein:

FIG. 7 illustrates a resolution map generated by the system of FIG. 1 in accordance with an embodiment of the present disclosure.

FIG. 7A illustrates a resolution map associated with an objective lens providing 2× magnification generated by the system of FIG. 1 in accordance with an embodiment of the present disclosure.

FIG. 7B illustrates a resolution map associated with an objective lens providing 4× magnification generated by the system of FIG. 1 in accordance with an embodiment of the present disclosure.

FIG. 7C illustrates a resolution map associated with an objective lens providing 10× magnification generated by the system of FIG. 1 in accordance with an embodiment of the present disclosure.

FIGS. 12-A to 12-H illustrate exemplary flow charts for providing real-time mosaic generation based microscope review of a slide in accordance with embodiments of the present disclosure.

FIG. 14A and FIG. 14B illustrate exemplary flow charts of a matching algorithm which may be used in embodiments of the present disclosure.

DETAILED DESCRIPTION

Figure 1:
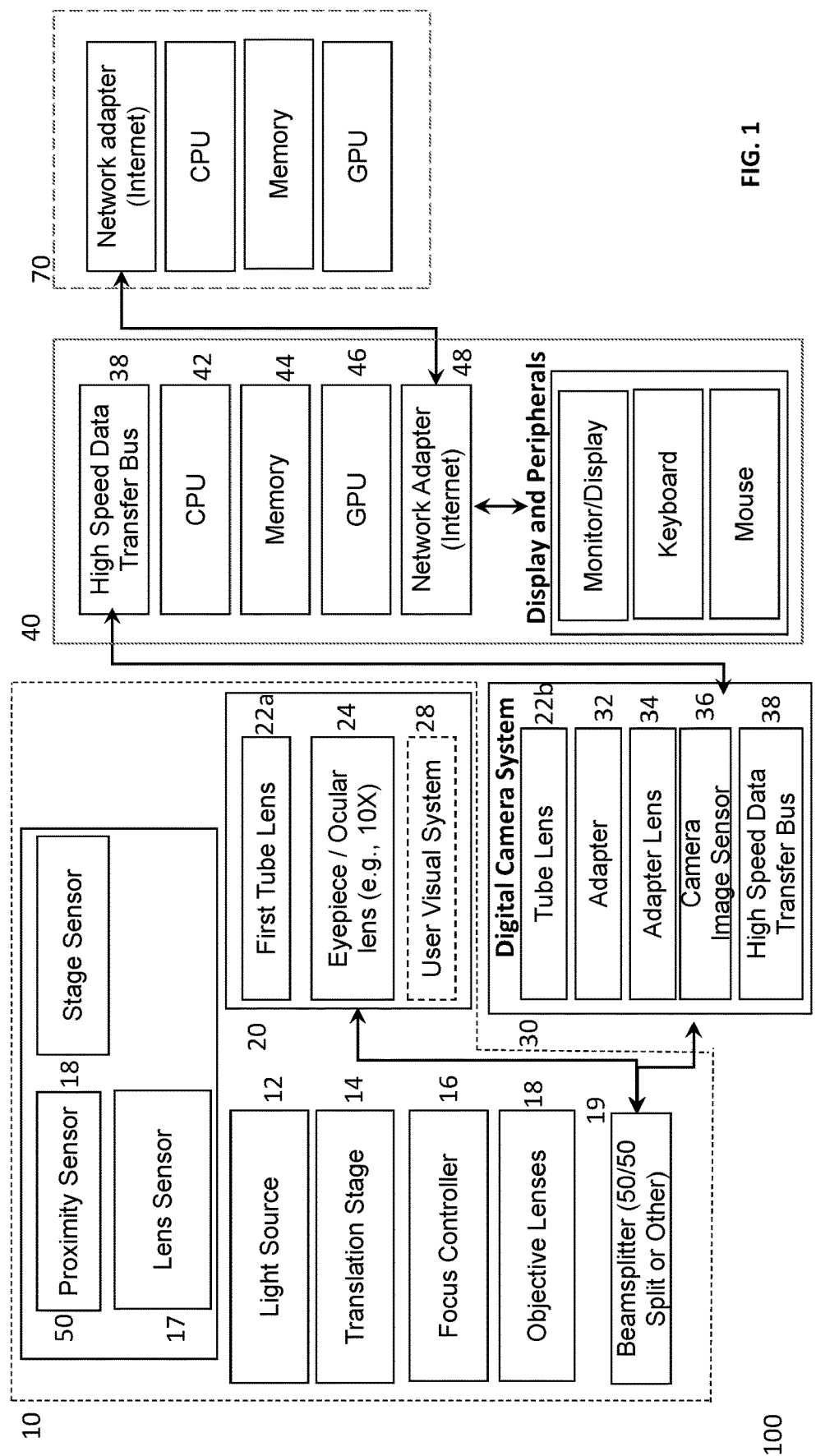
FIG. 1 shows an exemplary block diagram of a system for providing real-time mosaic generation based microscope review of a slide in accordance with an embodiment of the present disclosure.

The present invention generally relates to microscope slide imaging and more specifically to systems and methods for real-time imaging, video mosaicking, and variable resolution mosaic creation, storage, and visualization of microscope slides.

In embodiments, the present invention seeks to avoid the problems discussed above and redesign the data pipeline for constructing digitized microscope slide images that allow for viewing slides in a tiered manner to "focus-in" on areas of interest and to allow for building large data sets sufficient to allow for identification of image biomarkers that may be used to enhance diagnosis and treatment.

In embodiments, the method and system of the present invention fits within the pathologist's workflow. The present invention relates to a method and system allowing for the creating a digital record of a review of a slide using a microscope and for creating mosaic images of the slide showing the features of the slide reviewed to provide feedback to a user or others regarding the path followed during the review as well as the magnifications and time spent on specific features. In embodiments, an optical microscope may be adapted to provide images to a digital camera during slide review and within the normal working procedure of a pathologist or other user tasked with slide review. Image information related to these images is received by a controller operably connected to the microscope and then stored and or processed to provide the mosaic image as well as other feedback to the user. In embodiments, the digital camera should have a high enough frame rate to prevent blur and gaps in the video stream of digital images. In embodiments, the stream of digital information is provided at different resolutions as the pathologist changes magnification of the microscope using multiple objective lens and providing the image information in the same format so that the digital record of the slide review is streamlined to provide higher magnification for the portions of the slide that are reviewed more closely.

In embodiments, the method and system of the present application leverages clinical slide review to drive the acquisition of digital images at tiered magnification/resolution levels and then combines all of the data into a seamless variable resolution mosaic image that may be stored, displayed or retrieved by the user or others. In embodiments, real-time imaging may be used to provide a stream of digital images that are then combined using video mosaicking. In embodiments, variable resolution mosaic image creation, storage and visualization may also be provided in the method and system of the present invention.

In embodiments, a system for capturing images during review of a microscope slide includes: a microscope including a stage configured to support the microscope slide, a first objective lens providing a first magnification, a second objective lens providing a second magnification, a third objective lens providing a third magnification and a lens indicator sensor, wherein the microscope slide may be movable relative to the first objective lens, the second objective lens and the third objective lens; and wherein the lens indicator sensor may be configured to provide lens information indicating whether the first objective lens, the second objective lens or the third objective lens may be in use and including a first time stamp. In embodiments, the system may also include a digital camera operably connected to the microscope and configured to provide image information associated with images provided via the first objective lens, the second objective lens and the third objective lens during review of the microscope slide, wherein the image information may include: image data and a second time stamp associated with a time at which such image data was generated by the digital camera. In embodiments, the system may also include a controller operably connected to the digital camera and the microscope, wherein the controller may include at least one processor and memory operably connected to the controller and including processor executable code that when executed performs steps of: (1) receiving, by the controller from the digital camera, the image information; (2) receiving, by the controller from the microscope, the lens information; (3) capturing, by the controller, a plurality of digital images based on the image information and the second time stamp; (4) storing, by the controller, the plurality of digital images and the lens information in the memory; (5) selecting, by the controller, a first set of digital images from the plurality of digital images for inclusion in a mosaic image, wherein the first set of digital images may include at least a first digital image associated with the first objective lens, at least a second digital image associated with the second objective lens and at least a third digital image associated with the third objective lens, wherein the selecting may be based on the image information and the lens information; (6) generating, by the controller, a mosaic image using the first set of digital images and including at least the first digital image, the second digital image and the third digital image so that the mosaic image may include digital images of the first magnification, second magnification and third magnification, wherein, the generating may include matching at least the first digital image and at least one of the second digital image and the third digital image using a matching algorithm; (7) storing, by the controller, the first set of digital images in the memory.

In another embodiment, the system for capturing images during review of a microscope slide may includes: a microscope including a stage configured to support the microscope slide, a first objective lens providing a first magnification, a second objective lens providing a second magnification, a third objective lens providing a third magnification and a lens indicator sensor, wherein the microscope slide may be movable relative to the first objective lens, the second objective lens and the third objective lens and wherein the lens indicator sensor may be configured to provide lens information indicating whether the first objective lens, the second objective lens or the third objective lens may be in use and including a first time stamp. In embodiments, the system may include a digital camera operably connected to the microscope and configured to provide image information associated with images provided via the first objective lens, the second objective lens and the third objective lens during review of the microscope slide, wherein the image information may include image data and a second time stamp associated with a time at which such image data was generated by the digital camera, a controller operably connected to the digital camera and the microscope, wherein the controller may include at least one processor and memory operably connected to the controller. In embodiments, the memory may include processor executable code that when executed performs steps of: (1) receiving, by the controller from the digital camera, the image information; (2) receiving, by the controller from the microscope, the lens information; (3) capturing, by the controller, a plurality of digital images based on the image information and the second time stamp; (4) storing, by the controller, the plurality of digital images and the lens information in the memory; (5) selecting, by the controller, a first set of digital images from the plurality of digital images for inclusion in a first mosaic image, wherein the first set of digital images may include digital images associated with a first objective lens providing a first magnification, a second set of digital images from the plurality of digital images for inclusion in a second mosaic image, wherein the second set of digital images may include digital images associated with a second objective lens providing a second magnification, and/or a third set of digital images from the plurality of digital images for inclusion in a third mosaic image, wherein the third set of digital images may include digital images associated with a third objective lens providing a third magnification, wherein the selecting may be based on the image information and the lens information; (6) generating, by the controller, a mosaic image using the first set of digital images; (7) selecting, by the controller, a first set of digital images from the plurality of digital images for inclusion in a first mosaic image, wherein the first set of digital images may include digital images associated with a first objective lens providing a first magnification; a second set of digital images from the plurality of digital images for inclusion in a second mosaic image, wherein the second set of digital images may include digital images associated with a second objective lens providing a second magnification; and/or a third set of digital images from the plurality of digital images for inclusion in a third mosaic image, wherein the third set of digital images may include digital images associated with a third objective lens providing a third magnification, wherein the selecting may be based on the image information and the lens information; (8) generating, by the controller: the first mosaic image using the first set of digital images, the second mosaic image using the second set of digital images, the third mosaic image using the third set of digital images, and/or a fourth mosaic image based on a combination of the first mosaic image, the second mosaic image and the third mosaic image such that the fourth mosaic image may include digital images of the first magnification, second magnification and third magnification, wherein the generating may include matching a first at least one digital image of the first mosaic image and a second at least one digital image of the second mosaic image and a third at least one digital image of the third mosaic image using a matching algorithm; and/or (9) storing, by the controller, the first set of digital images, the second set of digital images, the third set of digital images and the fourth mosaic image in the memory.

A method for capturing images during review of a microscope slide using a microscope adapted to connection to a digital camera in accordance with an embodiment of the present disclosure may include: the steps of: (a) receiving, by a controller from the digital camera, first image information, wherein the controller may be operably connected to the digital camera and the microscope, wherein the microscope may include a stage configured to support the microscope slide, a first objective lens providing a first magnification, a second objective lens providing a second magnification, a third objective lens providing a third magnification and a lens indicator sensor, wherein the microscope slide may be movable relative to the first objective lens, the second objective lens and the third objective lens, wherein the lens indicator sensor may be configured to provide lens information indicating whether the first objective lens, the second objective lens or the third objective lens may be in use and including a first time stamp, wherein the first image information may be associated with images provided via the first objective lens, the second objective lens and the third objective lens during review of the microscope slide, and wherein the first image information may include image data and a second time stamp associated with a time at which such image data was generated by the digital camera; (b) receiving, by the controller from the microscope, the lens information; (c) receiving, by the controller from the digital camera, the first image information; (d) capturing, by the controller, a plurality of digital images based on the first image information and the second time stamp; (e) storing, by the controller, the plurality of digital images and the lens information in the memory; (f) selecting, by the controller, a first set of digital images from the plurality of digital images for inclusion in a mosaic image, wherein the first set of digital images may include at least a first digital image associated with the first objective lens, at least a second digital image associated with the second objective lens and at least a third digital image associated with the third objective lens, wherein the selecting may be based on the first image information and the lens information; (g) generating, by the controller, a mosaic image using the first set of digital images and including at least the first digital image, the second digital image and the third digital image so that the mosaic image may include digital images of the first magnification, second magnification and third magnification, wherein the generating may include matching at least the first digital image and at least one of the second digital image and the third digital image using a matching algorithm; and/or (h) storing, by the controller, the first set of digital images in the memory.

In embodiments, the first magnification may be 4× magnification, the second magnification may be 10× and the third magnification may be 20×.

In embodiments, the slide may be movable on the stage, and/or the stage may movable on the slide, relative the first objective lens, the second objective lens and the third objective lens. In embodiments a position sensor device may be operably connected to the stage and configured to provide position information, the position information including, but not limited to, position data indicating a position the microscope slide relative to the first objective lens, second objective lens and third objective lens, and a third time stamp.

In embodiments, a respective digital image of the plurality of digital images may be associated with at least one, and/or at least two objective lenses and at least one, and/or at least, two magnifications, respectively.

In embodiments, the selecting step may include determining a respective focus level for each digital image of the plurality of digital images, and comparing the respective focus level of each digital image to a threshold focus level, wherein respective digital images with a focus level below the threshold focus level are not selected for the first set of digital images. In embodiments, the determining step may include identifying keyfeatures in each digital image of the plurality of images wherein respective digital images with fewer than a threshold number of keyfeatures are determined to be of poor quality and are not selected for the first set of digital images.

In embodiments, the matching algorithm may include identifying a first keyfeature in the first digital image, identifying a second corresponding keyfeature in the second digital image, estimating a match value between the first keyfeature and the second keyfeature, generating a first transformation matrix based on the first keyfeature and the second keyfeature, identifying a third keyfeature in the second digital image, identifying a fourth corresponding keyfeature in the third digital image, estimating a match value between the third keyfeature and the fourth keyfeature, generating a second transformation matrix based on the third keyfeature and the fourth keyfeature, and/or stitching the first digital image to the second digital image based on the first transformation matrix and the second digital image to the third digital image based on the second transformation matrix, wherein the stitched digital images may be included in the mosaic image.

In embodiments, the memory may include processor executable code that when executed by the at least one processor executes a step of displaying the mosaic image on a display operatively connected to the controller and/or on a remote display element, to name a few.

In embodiments, the microscope may be selected from the group of: (1) a brightfield microscope, (2) a polarization microscope, (3) a fluorescence microscope, (4) a darkfield microscope, and (5) a reflectance microscope.

In embodiments, the image information may include still images and/or video, to name a few.

In embodiments, the memory may include processor executable code that when executed by the at least one processor executes a step of receiving a remote request to view the mosaic image via an internet connection and displaying the mosaic image on a remote display element via an internet connection.

In embodiments, the memory may include processor executable code that when executed by the at least one processor executes steps of receiving, by the controller, an update instruction, receiving, by the controller from the digital camera, second image information, receiving, by the controller from the microscope, second lens information associated with the second image information, capturing, by the controller, a second plurality of digital images based on the second image information, storing, by the controller, the second plurality of digital images and the second lens information in the memory, selecting, by the controller, a second set of digital images from the second plurality of digital images for inclusion in the mosaic image, wherein the selecting may be based on the second image information and second lens information, updating, by the controller, the mosaic image to include at least a portion of the second set of digital images, and/or storing, by the controller, the second set of digital images in the memory, to name a few. Other steps may include, but are not limited to, obtaining, at the controller, position information indicating movement of the microscope slide relative to the first objective lens, second objective lens and third objective lens, generating, by the controller, an instruction to change the sampling rate of the digital camera based on movement of the slide, and sending, by the controller to the digital camera, the instruction to change the sampling rate of the digital camera, as well as generating, by the controller, path information indicating a path of the first objective lens, second objective lens and third objective lens across the microscope slide during the review, wherein the path information includes position data, lens data, and timing information.

In embodiments, the generating step may include stitching the first set of digital images together and eliminating redundancy.

In embodiments, the generating step may include generating a whole or partial mosaic slide image.

In embodiments, the reviewed microscope slide may include a tissue sample.

In embodiments, the memory may include processor executable code that when executed by the at least one processor executes a step of storing, by the controller, image information and lens information for all digital images of the plurality of digital images.

In embodiments, the memory may include processor executable code that when executed by the at least one processor executes steps of generating, by the controller, at least one resolution map indicating pixels associated with each of the first objective lens, the second objective lens and the third objective lens, generating, by the controller, at least one dwell time map indicating a duration of time (dwell time) each image of the first set of digital images included in the mosaic image was viewed, and/or generating, by the controller, a path map indicating a respective path of the objective lens during the review of the microscope slide.

In embodiments, the system may include at least one ocular, wherein the at least one ocular may be provided downstream of the first objective lens, and the at least one ocular may be configured for a user to view images of the microscope slide.

In embodiments, the system may include a beam splitter positioned between the first objective lens, second objective lens and third objective lens and the ocular, wherein the beam splitter splits the image provided by the first objective lens, second objective lens and third objective lens between the ocular and the digital camera.

In embodiments, the digital camera may include an image sensor, wherein a size of the image sensor may be based on a field of view provided by the first objective lens, second objective lens and third objective lens such that the image sensor may be large enough to cover the entire field of view. In embodiments, the pixel size of the digital camera may be two times smaller than a diffraction limited spot size d provided by the first objective lens, second objective lens and third objective lens where $$d = \frac{1.22\lambda}{(NA_{obj} + NA_{cond})},$$

where $\lambda$ may be the wavelength of light, $NA_{obj}$ may be a numerical aperture of a selected objective lens, and $NA_{cond}$ may be the numerical aperture of a condenser lens.

In embodiments, a sampling rate of the digital camera may be varied based on movement of the slide.

In embodiments, the system may include a proximity sensor configured to provide an alert when a user may be positioned to view the slide in the microscope and wherein the sampling rate of the camera increases when the alert may be issued.

In embodiments, the path information may be based on the plurality of digital images, may be stored in memory, and/or may include magnification information associated with each position, wherein the magnification information may be based on the lens information. In embodiments, the memory may include processor executable code that when executed performs a step of generating, by the controller, a path map indicating the path of the first objective lens, second objective lens and third objective lens across the microscope slide during the review based on the path information.

In embodiments, wherein the step of generating the mosaic image may include choosing a coordinate on each digital image and localizing that coordinate within the full mosaic image, determining a time sequence and velocity of the slide based on the respective third timestamp associated with each of the coordinates. In embodiments, the mosaic image may be generated in real time.

In embodiments, the memory may include processor executable code that when executed by the processor performs a step of storing the mosaic image on a server accessible via the internet. In embodiments, the memory and/or the server may be accessible via another device. In embodiments, an update request may be provided via another device.

In embodiments, the selecting step may include identifying keyfeatures in each digital image of the plurality of images wherein respective digital images with fewer than a threshold number of keyfeatures are determined to be of poor quality and are not selected for the first set of digital images, second set of digital images or third set of digital images.

In embodiments, the matching algorithm may include identifying a first keyfeature in the first mosaic image, identifying a second corresponding keyfeature in the second mosaic image, estimating a match value between the first keyfeature and the second keyfeature, generating, a first transformation matrix based on the first keyfeature and the second keyfeature, identifying a third keyfeature in the second mosaic image, identifying a fourth corresponding keyfeature in the third mosaic image, estimating a match value between the third keyfeature and the fourth keyfeature, generating, a second transformation matrix based on the third keyfeature and the fourth keyfeature, and/or stitching the first mosaic image to the second mosaic image based on the first transformation matrix and the second mosaic image to the third mosaic image based on the second transformation matrix, wherein the stitched mosaic images may be included in the fourth mosaic image.

In embodiments, the method may also include a step of displaying the mosaic image on a display operatively connected to the controller, a step of displaying the mosaic image on a remote display element, a step of receiving a remote request to view the mosaic image via an internet connection; and/or displaying the mosaic image on a remote display element via an internet connection.

In embodiments, the method may include a step of receiving, by the controller, an update instruction, receiving, by the controller from the digital camera, second image information, receiving, by the controller from the microscope, second lens information associated with the second image information, capturing, by the controller, a second plurality of digital images based on the second image information, storing, by the controller, the second plurality of digital images and the second lens information in the memory, selecting, by the controller, a second set of digital images from the second plurality of digital images for inclusion in the mosaic image, wherein the selecting may be based on the second image information and second lens information, updating, by the controller, the mosaic image to include at least a portion of the second set of digital images, and/or storing, by the controller, the second set of digital images in the memory.

In embodiments, the method may also include storing, by the controller, first image information and lens information for all digital images of the plurality of digital images, and/or generating, by the controller, at least one resolution map indicating pixels associated with each of the first objective lens, the second objective lens and the third objective lens, at least one dwell time map indicating a duration of time each image of the first set of digital images included in the mosaic image was viewed, and/or, a path map indicating a respective path of the objective lens during the review of the microscope slide, to name of few.

In embodiments, the method may also include steps of obtaining, at the controller, position information indicating movement of the microscope slide relative to the first objective lens, second objective lens and third objective lens, generating, by the controller, an instruction to change the sampling rate of the digital camera based on movement of the microscope slide sending, by the controller to the digital camera, the instruction to change the sampling rate of the digital camera.

In embodiments the method may include a step of generating, by the controller, path information indicating a path of the first objective lens, second objective lens and third objective lens across the microscope slide during the review.

In embodiments, the method may include generating, by the controller, a path map indicating the path of the first objective lens, second objective lens and third objective lens across the microscope slide during the review based on the path information, and may include the steps of choosing a coordinate on each digital image and localizing that coordinate within the full mosaic image, and determining a time sequence and velocity of the microscope slide based on the respective second timestamp associated with each of the coordinates.

A system in accordance with an embodiment of the present disclosure may include a microscope, a digital camera, a computing device or data processing unit capable of receiving, storing, and processing digital images obtained during review of a microscope slide, a means of capturing a first and subsequent digital images either continuously or at fixed subsampling intervals, and/or a means of compositing or storing captured images. In embodiments, a method of capturing images during review of a microscope slide in accordance with an embodiment of the present disclosure includes: capturing digital images using a digital camera during review of a microscope slide, receiving, storing, and processing digital images obtained during review of a microscope slide, capturing a first and subsequent digital images either continuously or at fixed subsampling intervals, and compositing or storing captured images.

In embodiments, the digital camera may be integrated into or otherwise connected to the microscope and may be capable of capturing video images. In embodiments, method may include capturing a first and subsequent digital images either continuously or at fixed subsampling intervals and utilizing the sequence and magnification level of image capture during review of said microscope slide. In embodiments, the method and system may include compositing or storing captured images to construct a microscope slide image. In embodiments, the method and system may include compositing captured images to construct a microscope slide image and may include stitching or mosaicking, and may utilize variable resolution imaging, and may include a whole or partial slide image based on the sequence and magnification level of image capture during review of said microscope slide. In embodiments, a microscope slide image may be constructed with higher and lower resolution corresponding to the sequence and magnification level of image capture during review of said microscope slide. In embodiments, the constructed microscope slide image may be a whole slide image constructed by registering higher resolution images to a lower resolution whole slide image, which may be stored to allow for subsequent viewing. In embodiments, the system and method may include compositing or storing captured images comprising a record of review of said microscope slide by a reviewer. In embodiments, the record of review may include magnification, sequence of view, and duration of view (dwell time) of captured images and may be stored to allow for subsequent viewing. In embodiments, the reviewer may be a pathologist. In embodiments, the reviewed microscope slide may be a tissue sample. In embodiments, the images may be captured within the workflow of a pathologist's review of a tissue sample. In embodiments, the system and/or method may include at least one algorithm capable of processing or compositing said images.

In embodiments, the system and method may include global registration of multiple mosaics across resolution scales into a single data-efficient adaptive resolution image. In embodiments, the system and method may include a method of dynamic recovery of resolution in areas of said microscope slide sampled at low resolution, using high-resolution-low-resolution pairs from said microscope slide image to complete final stages of model training using same-domain transfer learning approaches. In embodiments, the system and method may include the development of machine learning approaches to dynamically recover resolution in areas of the slide sampled at low resolution. In embodiments, the system and method may include dynamic recovery of focus in areas of said microscope slide sampled out of focus. In embodiments, the system and method may include a the development of machine learning approaches to dynamically recover focus in areas of the slide sampled out of focus.

In embodiments, referring to FIG. 1 for illustration purposes, a clinical compound microscope 10 may be modified to include or be operably connected to a color digital camera 30. In embodiments, the color digital camera 30 may be used to obtain image information associated with a slide S while a specimen on such slide is being viewed using the microscope 10. In embodiments, the image information is collected as the microscope 10 is the same image used during examination of the slide S by a pathologist such that the examination of the slide is recorded in real-time or near real-time. In embodiments, the image information may be provided to a controller 40 that processes the image information and creates and stores a digital record of the examination of the slide S and may provide a seamless digitized whole slide mosaic image. In embodiments, the image information is collected during diagnostic review of the slide S such that the data collected is limited to the areas of interest on the slide from a diagnostic point of view. Since the image information reflects the approach of a pathologist in a clinical review, the image information collected may be used to optimize slide digitization or compression strategies as well as to support diagnosis, pathology education and machine learning research. In addition, the image information collected by the digital camera 30 may be used to provide critical saliency maps that may be used to provide computer automated microscopes trained to automatically generate optimal whole slide images. The image information collected may also be used to provide feedback to the user regarding the portions of the slide reviewed, the magnification they were reviewed at and the time spent reviewing different portions of the slide to ensure that all portions of the slide were reviewed with appropriate magnification and consideration.

In embodiments, the image information may be used to provide training sets in order to train useful machine learning algorithms for digital pathomics, and/or to provide fully computer automated microscopes and to identify which areas of digital pathology images that are salient (e.g., what are the regions of interest, and what are their labels). In embodiments, the machine learning algorithms may include a neural network, a convolutional neural network, a generative adversarial network, and/or a hidden Markov model, to name a few. The image information includes image data that is collected at high magnification, and may include timing information or time stamp information that may be used to determine or indicate how long areas were viewed and in which order. In embodiments, the image information provides critical information about the importance of underlying image features that are useful for future machine learning tasks as well as for current diagnosis and training.

In embodiments, the system and method of the present invention may provide for creation of a digitized slide inside of the normal pathology workflow, thereby increasing digital pathology utilization and data. In embodiments, the digitized slide may be provided as a mosaic image that reflects the image information provided during the review of the slide S at different magnifications as well as additional review information to provide feedback to a user or others regarding the slide review. In embodiments, the mosaic image and feedback information may be provided in real time or near real time such that it is available for review during and immediately after review to aid the user and others to analyze the review and determine if additional review is necessary or advisable.

Further, in embodiments, the system and method of the present invention may provide for the creation of a mosaic image of the slide S as reviewed under microscope by a pathologist or other user, including portions having the same magnification as used by the pathologists or other user to capture the non-redundant images without recording portions found to be less relevant during the review process. In embodiments, the system and method of the present invention allows for identification of portions of the slide S that were not captured or not sufficiently captured, and allow for the pathologists or other user to add additional imagery to capture additional details that might otherwise have been missing.

Figure 6A:
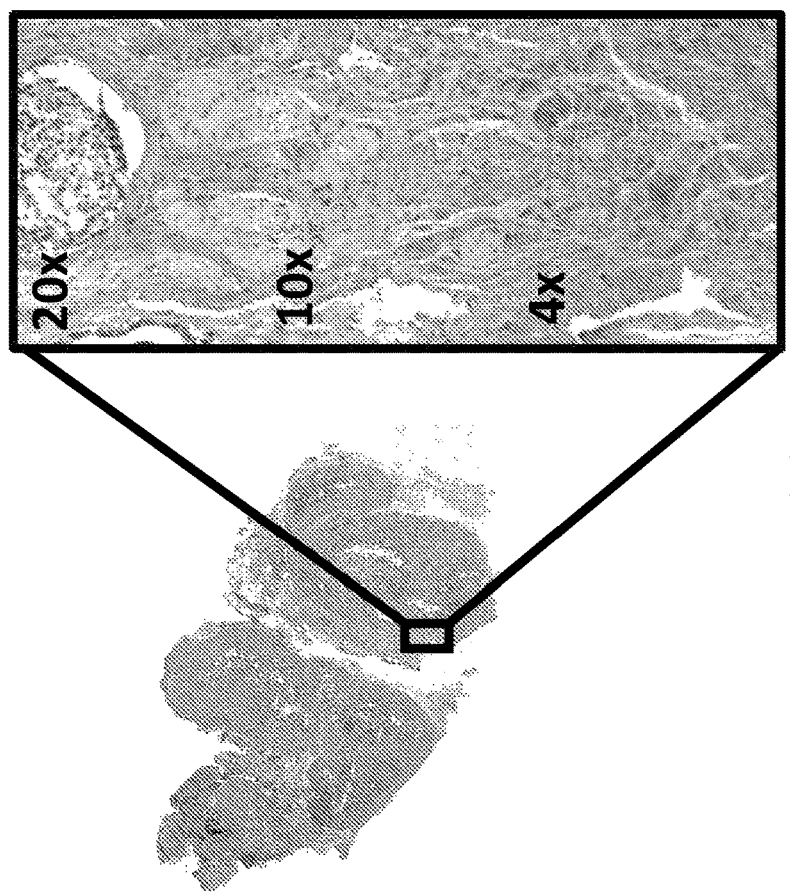
FIG. 6A illustrates a more detailed view of the mosaic image generated by the system of claim 1 showing portions thereof that are provided at different magnifications in accordance with an embodiment of the present disclosure.
Figure 6:
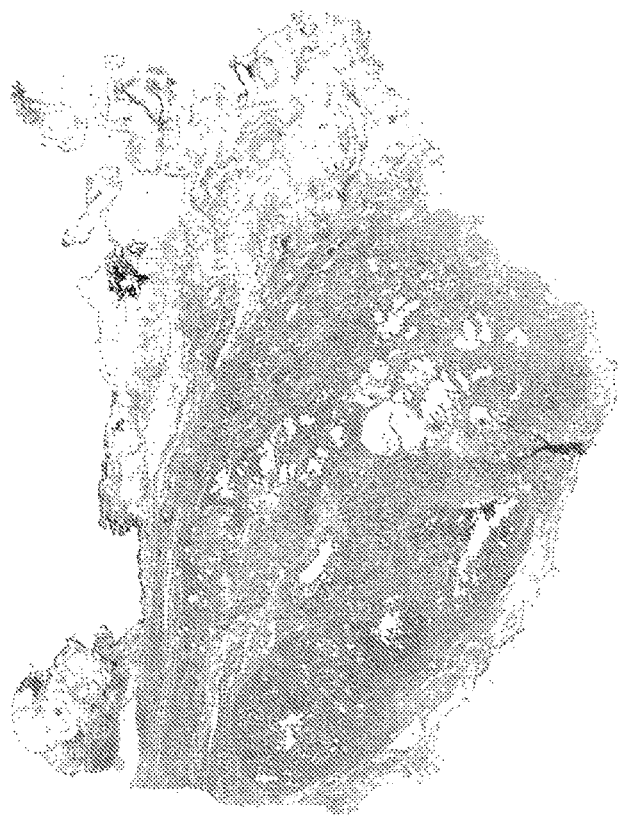
FIG. 6 illustrates an exemplary mosaic image generated by the system of FIG. 1 in accordance with an embodiment of the present disclosure.

In embodiments, the image information may be used to provide a mosaic image (see FIG. 6, for example) of the slide S including images at different magnifications or resolutions (see FIG. 6A, for example) at different portions of the slide reflecting the magnifications that were used during the review. In embodiments, the method and system of the present invention provides for a mosaic image that adjusts for translational speed and direction, image resolution, camera frame rate, frequent refocusing and varying objective lenses.

In embodiments, the method and system of the present invention enables digital pathology images and diagnostic information to be collected as part of the standard clinical workup and be immediately available within the patient medical record, locally or remotely. In embodiments, this may impact not only the availability of data for research, but also for clinical practice. The latter would improve communication between pathologists and clinicians who are treating individual patients and would enable institutions with limited resources for image acquisition and storage to contribute to collaborative pathology image repositories. In embodiments, the method and system of the present invention provide a rich data resource for further study that could inform future slide digitization strategies, contribute to artificial intelligence algorithms for diagnosis and prognosis, and contribute to education by studying habits of expert pathology raters.

In embodiments, the present invention discloses a system and method for capturing images during review of a microscope slide. In embodiments, as illustrated in FIG. 1, for example, the system 100 may include a microscope 10; a digital camera system, or digital camera, 30 and a controller 40 which may be a computing device or data processing unit capable of receiving, storing, and processing digital image information obtained during review of a microscope slide from the digital camera 30.

Figure 2:
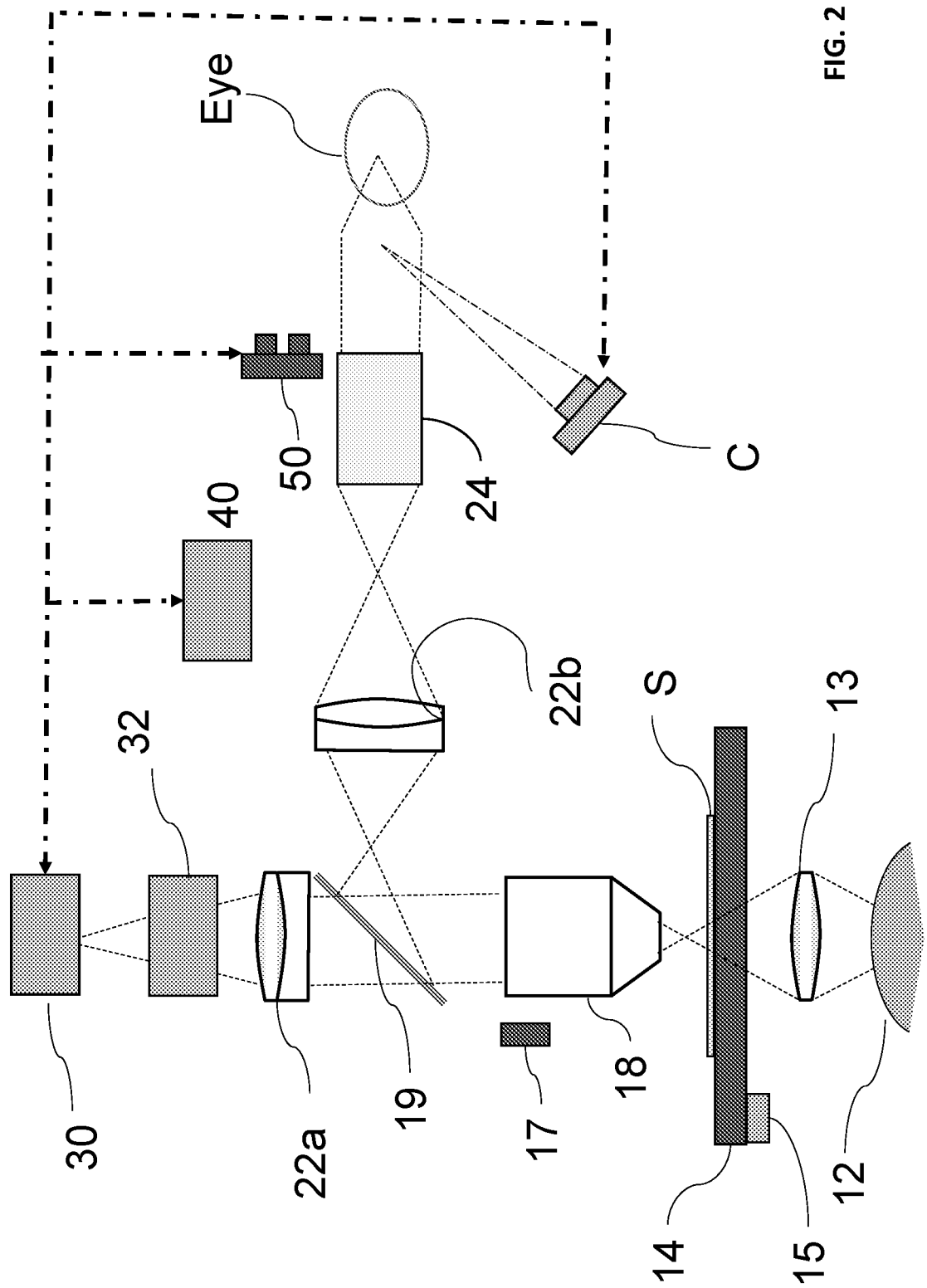
FIG. 2 illustrates an exemplary schematic illustration of the system of FIG. 1 in accordance with an embodiment of the present disclosure.

Continuing with FIG. 1, in embodiments, the microscope 10 may include a light source 12, a translation stage 14 configured to support the slide S to be examined using the microscope 10. In embodiments, a focus controller 16 may be provided to adjust focus of images of the slide S. In embodiments, the focus controller 16 may be a knob or other input element that may be used to move the objective lenses 18 closer to or farther away from the slide S to adjust focus. In embodiments, two or more objective lenses 18 may be used to provide at least two different magnifications. For example, magnifications may be 4×, 10×, 20×, 40×, to name a few. In embodiments, the objective lenses 18 may provide a wide variety of magnifications such as 2×, 4×, 10×, 15×, 20×, 40×, 60×, 63×, 100×, to name a few. In embodiments, fewer magnifications and/or other magnifications may be used. In embodiments, three or more objective lenses 18 may be used and may provide three or more respective magnifications. In embodiments, as depicted in FIG. 2, the microscope 10 may include a position sensor 15 that may be used to provide an indication of a position of the slide S relative to the objective lens 18. In embodiments, the position sensor 15 may provide position information that indicates the position of the stage 14 relative to the objective lenses 18. In embodiment, position information may be determined by the controller 40 based on a comparison image information provided to the controller 40 from the digital camera 30.

In embodiments, the microscope 10 may include an ocular portion 20 through which an image of the slide is visible by a user, such as a pathologist reviewing the slide S. In embodiments, the ocular portion 20 may include a tube with a tube lens 22a provided therein and an eyepiece lens 24 provided at a top thereof. In embodiments, the microscope 10 may not include an eyepiece 24 and instead may be connected to a display element that may be included in user visual system 28 through which the image of the slide S is provided. In embodiments, the microscope 10 may include a beamsplitter 19 such that the image of the slide S may be divided between the eyepiece lens 24 and the digital camera 30.

In embodiments, the digital camera 30 may include or be operably connected to an adapter 32 with an adapter lens 34 suitable for connection to the microscope 10. In embodiments, the adapter lens 34 may provide the image of the slide from the beamsplitter 19 to the image sensor 36. In embodiments, the digital camera 30 may be operatively connected to the controller 40. In embodiments, the connection between the digital camera 30 and the controller 40 may be via high-speed bus 38, for example. In embodiments, the image sensor 36 may provide image data associated with the image provided by the objective lenses 18. In embodiments, operation of the image sensor 36 may be controlled by a camera controller (not shown). In embodiments, a camera memory (not shown) may be operatively connected to the camera controller and may include processor executable code that when executed by the camera controller controls the operation of the camera 30. In embodiments, the camera controller may control the image sensor 36 to provide image information at a camera frame rate or camera sampling rate. In embodiments, the camera sampling rate may be adjusted by the camera controller. In embodiments, the camera sampling rate may be varied based on instructions provided by the controller 40. In general, as is discussed below, the camera sampling rate or frame rate will be increased when movement of the slide S is high to avoid blur and may be lower or remain the same when there is no movement or movement is minimal to reduce the amount of redundant image data collected.

In embodiments, the frame rate or sampling rate used by the digital camera 30 may be a maximum of 200 frames per second and the image resolution of each frame may be 1080×1440 pixels. In embodiments, the digital camera 30 may have a frame rate of 26 frames per second and the image resolution of each frame may be 6464×4852 pixels. In embodiments, the frame rate or sampling rate of the camera 30 may be varied as noted above. In embodiments, other image resolutions may be used. In embodiments, the size of the camera's image sensor 36 may affect generation of the mosaic image since a smaller sensor may not fully capture the images provided in the ocular/eyepiece of the microscope 10 because the sensor 36 only samples a percentage of the ocular field of view. In embodiments, a large format, high resolution camera may be preferably used to maximize the coverage between ocular FOV and camera FOV.

In embodiments, the camera sensor 36 preferably has a dimension large enough to capture 90% or more of the field of view of the eyepiece lens 24. In embodiments, this may be accomplished in 2 ways: (1) if there is no additional magnification in the adaptor 32 between the microscope 10 and the camera 30, the camera should cover 90-100% of the standard field of the microscope (usually a circle with dimensions of 20 mm to 25 mm), or (2) a smaller sensor may be used if the image from the microscope 10 is de-magnified before reaching the camera 30, however this may lead to poor resolution.

In embodiments, the frame rate or sampling rate of the camera 30 should be sufficiently fast to acquire images fast enough such that there are no gaps in the final stitched mosaic image. A first approximation is a frame rate high enough to ensure a minimum level of overlap (for instance, 20±10% for the SIFT algorithm, but the % overlap may be smaller) between adjacent frames at maximum stage speed, that is, speed of movement of the slide S or stage 14. In embodiments, the minimum required frame rate may be a function of stage or slide speed. The maximum stage translation distance which maintains the specified overlap may be given by the equation:

$$\text{Distance} = \text{frame width}(1 - \text{overlap \%})$$

Therefore, the minimum frame rate to ensure at least 20% overlap is:

$$\text{Frame rate (fps)} = \text{stage speed} * (2 \text{ frames})/\text{Distance}$$

In embodiments, the pixel size of the camera 30 should be small enough that it properly samples the image projected from the microscope 10. In embodiments, the Rayleigh criterion may be used to determine the smallest resolvable dimension of an optical system. In embodiments, the camera pixel size should be at least half of the smallest resolvable dimension across all objective magnifications. The equation determining minimum pixel size is:

$$\text{pixel size} < ((1.22\lambda/2(\text{NA\_obj} \times \text{NA\_cond}) \times \text{objective } mag))/2$$

where NA_obj is the numerical aperture of the objective lens and NA_cond is the numerical aperture of the condenser lens.

In embodiments, the controller 40 may include a central processor unit 42, or other processor operatively connected to memory 44. In embodiments, the memory 44 includes processor executable code that when executed by the central processor unit 42 performs a step of: receiving, from the digital camera, the image information. In embodiments, the image information may include image data indicative of the image of the slide S provided by the digital camera 30 and a time stamp or other timing information indicating a time at which the image data was provided by the digital camera. In embodiments, the controller 40 may include a graphics processing unit (GPU) 46 that may be used to process the image data. In embodiments, the CPU and GPU may or may not be distinct units. In embodiments, the controller 40 may include a network adaptor 48, which may be used to communicate with remote devices via the Internet or via another network. In embodiments, the controller 40 may be operably connected to a display or monitor and to one or more input devices such as a keyboard or mouse, for example. In embodiments, the display may be a touchscreen that may allow for input of information.

In embodiments, the controller 40 may be connected or in communication with a remote device or terminal 70. In embodiments, the remote device 70 may request and view information from the controller 40 including the mosaic image discussed below and or the maps illustrated in FIGS. 6-10. In embodiments, information may exchange between the controller 40 and the remoted device 70 via the internet.

In embodiments, the processor executable code may, when executed by the processor, CPU 42, for example, perform a step of receiving from the microscope 10, the lens information, from the lens sensor 17, for example. As noted above, the lens information may indicate an objective lens 18 that is in use, as well as a time stamp or timing information that indicates the time at which the objective lens is in use. In embodiments, the lens information may be associated with image data based on common time stamp or timing information. In embodiments, the lens information may be used to indicate or determine a magnification associated with the image data.

In embodiments, the processor executable code may when executed by the processor, perform a step of capturing a plurality of digital images based on the image information and the second time stamp included in the image information, wherein each digital image may be associated with a respective objective lens 18, and a corresponding magnification associated therewith, e.g., 4×, 10×, 20×, 40×. In embodiments, the capturing step may include processing the image information provided from the digital camera and providing at least a first digital image, a second digital image and a third digital image. In embodiments, each digital image may be a single frame provided by the digital camera. In embodiments, the digital image may include a combination of multiple frames provided by the camera. In embodiments, the different frames may include image data associated with the same location on the slide or substantially the same location on the slide where there is at least substantial overlap between the frames. In embodiments, overlap of more than 10% is preferred in order to combine frames into a single image. In embodiments, in most cases, in view of the frame rates typically used by digital cameras, the magnification of multiple successive frames will likely be the same. In such cases, in embodiments, a respective digital image may be based on multiple frames of images. In embodiments, where the magnification between frames changes, those frames would typically not be combined into a single image.

In embodiments, the processor executable code may, when executed by the processor, may perform a step of storing the plurality of digital images in the memory 44. In embodiments, the plurality of images may be stored elsewhere, if desired, for example, at the remote device 70, for example. In embodiments, the plurality of digital images may be stored with corresponding lens information (and time stamp) indicating a magnification associated with each of the digital images at discrete times. In embodiments, the plurality of digital images may be stored with position information indicating a position of the digital image with respect to the slide S. In embodiments, the plurality of digital images may also be stored with corresponding second time stamp information indicating a sequence of the digital image in the review of the slide S.

In embodiments, the processor executable code may, when executed by the processor, perform a step of selecting, by the controller, a first set of digital images from the plurality of digital images for inclusion in a mosaic image. In embodiments, the first set of digital images includes at least a first digital image associated with the first objective lens, at least a second digital image associated with the second objective lens and at least a third digital image associated with the third objective lens.

In embodiments, the step of selecting may include determining, for each digital image of the plurality of digital images, a focus level associated with the focus of the digital images. In embodiments, the focus level of each digital image of the plurality of digital images may be compared to a threshold focus level. In embodiments, digital images with a focus level that meets or exceeds the threshold focal level may be selected for inclusion in the first set. In embodiments, digital images with a focus level that is below the threshold focus level are not selected for inclusion in the first set. In embodiments, the focus level of each of the digital images may be determined based on identification of keyfeatures in each digital image. Since keyfeatures are more easily identified in digital images that are in focus, in embodiments, the focus level may be determined based on a number of keyfeatures that are identified. In embodiments, digital images in which the number of keyfeatures identified is less than a keyfeature threshold are considered to be in poor focus and are not selected for inclusion in the first set. In embodiments, digital images in which the number of keyfeatures identified is more than a keyfeature threshold are considered to be in focus and are selected for inclusion in the first set.

In embodiments, the selecting step may include selecting digital images associated with the highest focus value for inclusion in the first set. In embodiments, the selecting step may also be based on the magnification or lens information associated with the digital image such that the first set of digital images includes digital images associated with different magnifications or objective lenses and includes images with the highest available magnification for a particular position on the slide S.

In embodiments, digital images are selected for the first group based on considering maximum available magnification, overlap, registration quality, and focus quality. In embodiments, selecting may include a registration step and images may be stitched together based on a magnification level. That is, all registered frames within a magnification level may be grouped together in a set and may be stitched into individual sub-mosaics. In embodiments, registration between the sub-mosaics and the lowest magnification mosaic may be known and they may be stitched together into a single mosaic image with variable resolution or magnification. In embodiments, in order to provide an accurate record, the set of digital images should cover the slide S but minimize overlap between digital images while maximizing image quality.

Figure 11B:
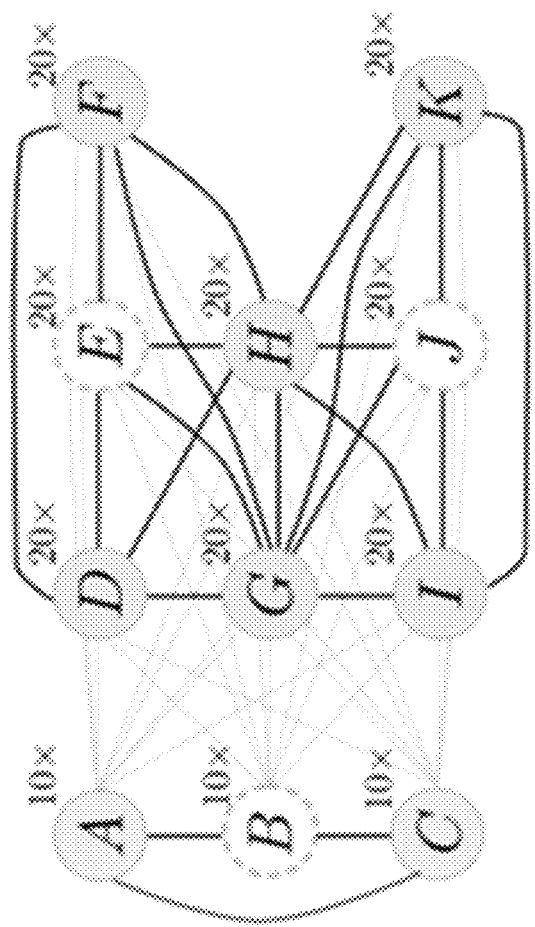
FIG. 11B illustrates an exemplary graph used in selecting a first set of digital images for inclusion in the mosaic image in accordance with an embodiment of the present disclosure.
Figure 11A:
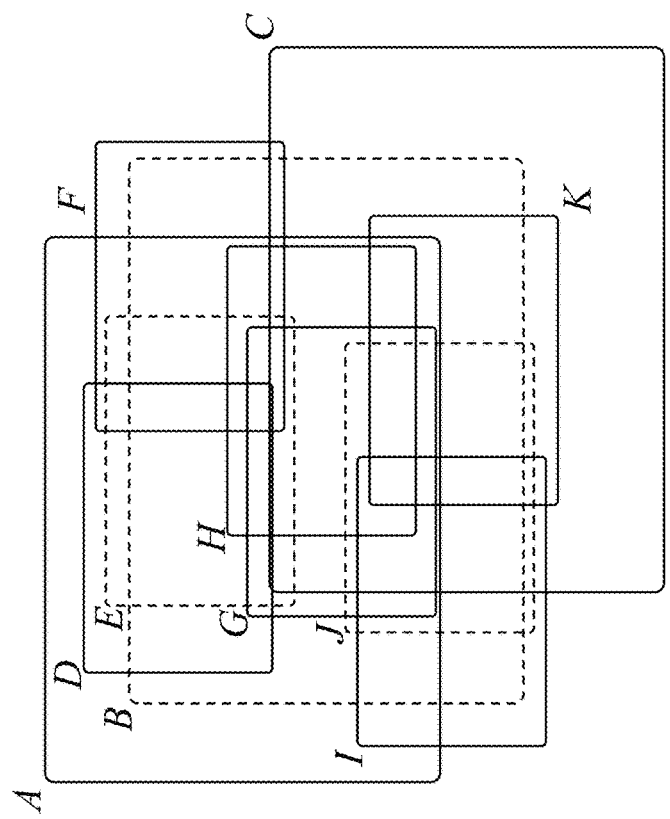
FIG. 11A illustrates an exemplary plurality of digital images to be selected for including in a first set of digital images to be included in the mosaic image in accordance with an embodiment of the present disclosure.

In embodiments, this problem may be addressed as a 2D version of a streaming geometric set cover problem. In embodiments, image registration may provide a graph, where every image of the first set is a node and edges correspond to overlaps between frames. In embodiments, nodes of the graph may be weighted based on an image's magnification level and focus level while edges may be weighted by registration quality and percentage of overlap. In embodiments, a small subgraph with coverage, but that also maximizes magnification, focus, and registration quality and minimizes overlap between frames may be determined. FIGS. 11 and 11B provides a simple example with a corresponding graph, where removing the dashed frames gives a coverage that maximizes magnification. In FIG. 11A, a set of digital images at two magnification levels 10× and 20× are illustrated. In embodiments, the corresponding graph in FIG. 11B has a node for each digital image and an edge for every two overlapping images. In embodiments, edge weights (e.g., registration quality) and node weights (e.g., focus quality) are not shown. In embodiments, removing the dashed frames shows that frames A, B, D, F, G, H, I, K cover the entire area, and frames with higher magnification receive priority and are included in the first set.

In embodiments, the processor executable code may, when executed by the processor, perform a step of generating a mosaic image using the first set of digital images. In embodiments, the mosaic image may include at least the first digital image, the second digital image and the third digital image such that the mosaic image includes digital images associated with different magnifications. In embodiments, the mosaic image includes digital images of the first magnification, second magnification and third magnification and reflects magnifications actually used during review of the slide S. In embodiments, the generating step may include matching at least the first digital image to one of the second digital image and the second digital image. In embodiments, the generating step may include matching at least the first digital image and at least one of the second digital image and the third digital image using a matching algorithm.

In embodiments, in order to generate a mosaic image including multiple, smaller overlapping digital images, the position of each digital image in relation to its neighbor may be calculated using a matching algorithm. In embodiments, the first step in matching a pair of digital images includes detecting unique aspects of the images, called keyfeatures. In embodiments, several popular feature detection and matching algorithms may be used, including ORB (Oriented FAST and Rotated BRIEF), FLANN (Fast Library for Approximate Nearest Neighbors), SURF (Speeded Up Robust Feature), FAST (Features from Accelerated Segment Test), and SIFT (Scale Invariant Feature Transform), to name a few. In embodiments, another method used for image registration is phase correlation, which compares the phase shift of the two images in the frequency domain. However, phase correlation only determines translation, not rotation or scale. In embodiments, of the feature detection algorithms, ORB and SURF are about 3× faster than SIFT, however SIFT performs better across scales such as the different magnifications provided by the objective lenses 18.

In embodiments, the step of matching may include identifying a first keyfeature in the first digital image. In embodiments, the step of matching may include identifying a second corresponding keyfeature is at least one of the second digital image and the third digital image. In embodiments, the matching step may include estimating a match value between the first keyfeature and the second keyfeature. In embodiments, the matching step may include generating a first transformation matrix based on the first keyfeature and the second keyfeature. In embodiments, the matching step may include identifying a third keyfeature in the second digital image and a fourth corresponding keyfeature in the third digital image and estimating a match value between the third keyfeature and the fourth keyfeature. In embodiments, the matching step may include generating, a second transformation matrix based on the third keyfeature and the fourth keyfeature. In embodiments, the generating step includes stitching the first digital image to the second digital image based on the first transformation matrix and the second digital image to the third digital image based on the second transformation matrix wherein the stitched digital images are included in the mosaic image. In embodiments, this process may be repeated for all of the digital images in the first set of digital image to provide the mosaic image.

In embodiments, the scale of an image in microscopy depends on the magnification, that is the objective lens 18 used, and it may be difficult to match objects across scales because new details on the object may be present when the scale is enlarged. In embodiments, SIFT may be used to blur the images, which removes some of the details, and then compares the blurred images at various scales to provide for matching of images across scales or magnifications. As noted above, the mosaic image generated in the generating step includes digital images provided at different magnification such that SIFT may be used.

In embodiments, using SIFT, images may be successively downsampled by 2 and blurred. In embodiments, Gaussian blur may act as a low pass filter to remove high frequencies. In embodiments, each stack of downsampled images may be called an octave. In embodiments, after creating the image octaves, each downsampled image in the octaves may be subtracted using the Difference of Gaussian (DoG) as a scale-invariant approximation for the more computationally intensive Laplacian of Gaussian (LoG). The Laplacian is a second order derivative that detects extrema, or edges. Edges are useful for distinguishing parts of the image. The DoG operation may remove the scale term in the Gaussian function, which makes it independent of scale.

In embodiments, to find the keyfeatures, each pixel's intensity value may be checked against those of its neighbors, including the images above and below it in scale space, to find the local maxima or minima. In embodiments, keyfeatures may be identified as a local maxima or minima. In embodiments, this produces many keyfeatures, but some keyfeatures, however, keyfeatures on an edge or that have low contrast are typically less useful. In embodiments, low contrast features may be removed by specifying a threshold for intensity magnitude. In embodiments, edges may be removed by considering two perpendicular gradients around the edge keyfeature. In embodiments, if the gradient is large in one direction only, the keyfeature is on an edge and it may be removed while if both gradients are large, the keyfeature is not on an edge and may be kept.

In embodiments, the keyfeatures' orientations may be calculated to ensure rotation invariance. In embodiments, gradient magnitudes and orientations around each keyfeature may be calculated to determine the likely orientation of the keyfeature. In embodiments, after keyfeatures are detected, the features from one image are paired with the features of the next image, using brute force k-nearest neighbor matching (k=2), for example. However, in embodiments, some proposed matches may be incorrect due to noise in the images. In embodiments, false positives may be eliminated with Lowe's ratio test such that when the ratio of the Euclidean distance from the closest neighbor to the next closest is above 0.75, the match is kept.

In embodiments, Random Sample Consensus (RANSAC) may be used with SIFT to estimate the best set of feature matches iteratively. In embodiments, the typical procedure includes:

Loop N Times
   a. Randomly select X corresponding data points or 'matches',
   b. Set up a system of linear equations (e.g., linear equations that describe the distance between corresponding points) and minimize the least square objective function to find the line of best fit,
   c. Identify inliers, matches where the residual (error) is less than a specified amount of pixels (e.g., the points which are close to the line of best fit),
   d. If the number of inliers is greater than the number of inliers previously calculated, update and store the set of inliers
End loop
   e. The set of matches with the largest number of inliers is kept, and the final transformation is calculated. The transformation or 'homography' matrix is of the form:

$$\begin{pmatrix} x' \\ y' \\ 1 \end{pmatrix} = \begin{pmatrix} h_{00} & h_{01} & h_{02} \\ h_{10} & h_{11} & h_{12} \\ h_{20} & h_{21} & h_{22} \end{pmatrix} \begin{pmatrix} x \\ y \\ 1 \end{pmatrix}$$

Assuming no rotation (in the case of planar microscope stage movement), the matrix reduces to $$\begin{pmatrix} x' \\ y' \end{pmatrix} = \begin{pmatrix} h_{00} & h_{01} \\ h_{10} & h_{11} \end{pmatrix} \begin{pmatrix} x \\ y \end{pmatrix}$$

Scale is given by:

$$\frac{h_{00}h_{11} + h_{10}h_{01}}{\sqrt{h_{00}^2 + h_{01}^2}}$$

In embodiments, alternatives to RANSAC may be used and may include regular least squares estimate. In embodiments, RANSAC may be more robust because it handles cases where correspondences do not follow a normal distribution and there are outliers. In embodiments least median of squares may be used to find the best fit of the majority of correspondences and may be more robust to outliers than regular least squares. In embodiments, RANSAC may be more robust than least median of squares when there are few (less than 50%) inlier matches. In embodiments, least median of squares may be more computationally expensive.

In embodiments, the first set of digital images may be selected based on magnification. That is, in embodiments, the first set of digital images may all have the same magnification to provide the mosaic subset discussed above. In embodiments, multiple sets of digital images may be selected with each set associated with a respective magnification. In embodiments, a separate mosaic image may be generated for each magnification provided by the objective lenses 18. In embodiments, the separate mosaic images may be combined into one mosaic image including digital images associated with all magnifications in the generating step.

In embodiments, the processor executable code may, when executed by the processor, performs a step of storing the first set of digital images in the memory. In embodiments, this step may include storing the multiple sets of digital images in memory. In embodiments, the first set of digital images is stored including the image data, first time stamp, lens information, second time stamp and position information.

Figure 9:
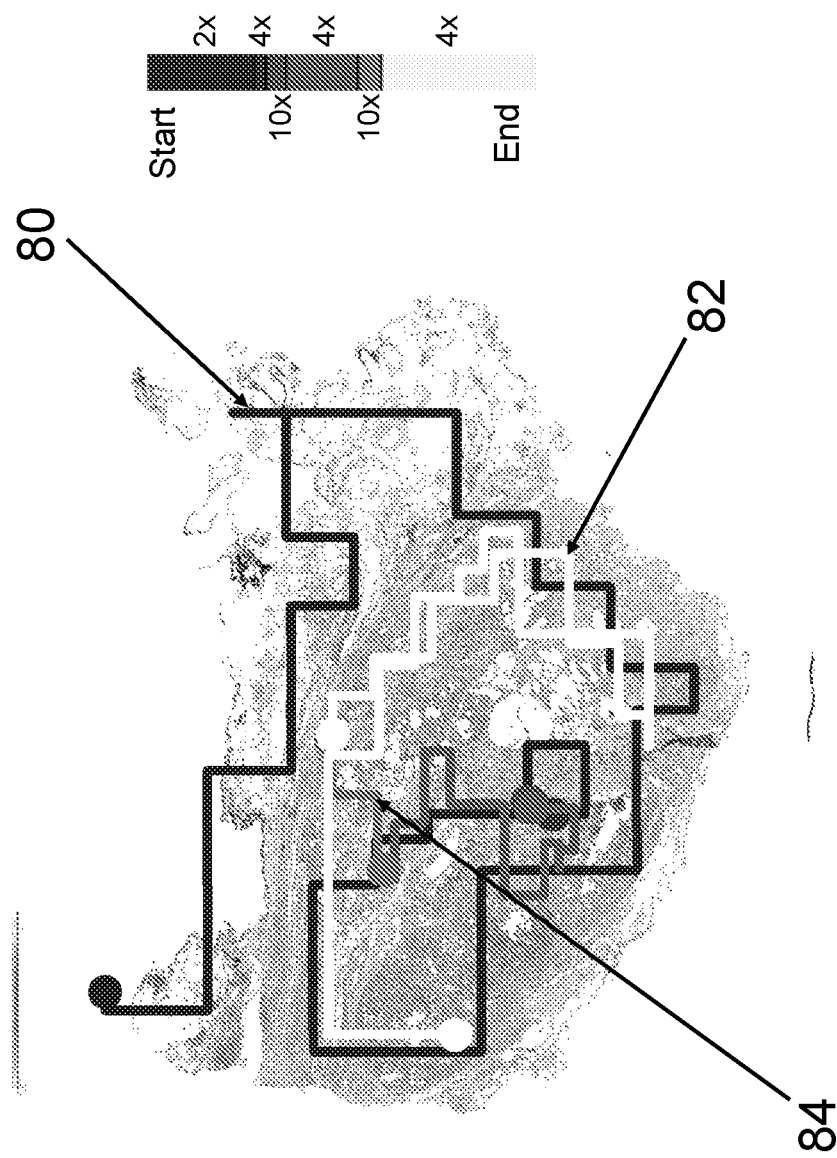
FIG. 9 illustrates a lens path map generated by the system of FIG. 1 in accordance with an embodiment of the present disclosure.
Figures 9A, 9B, 9C:
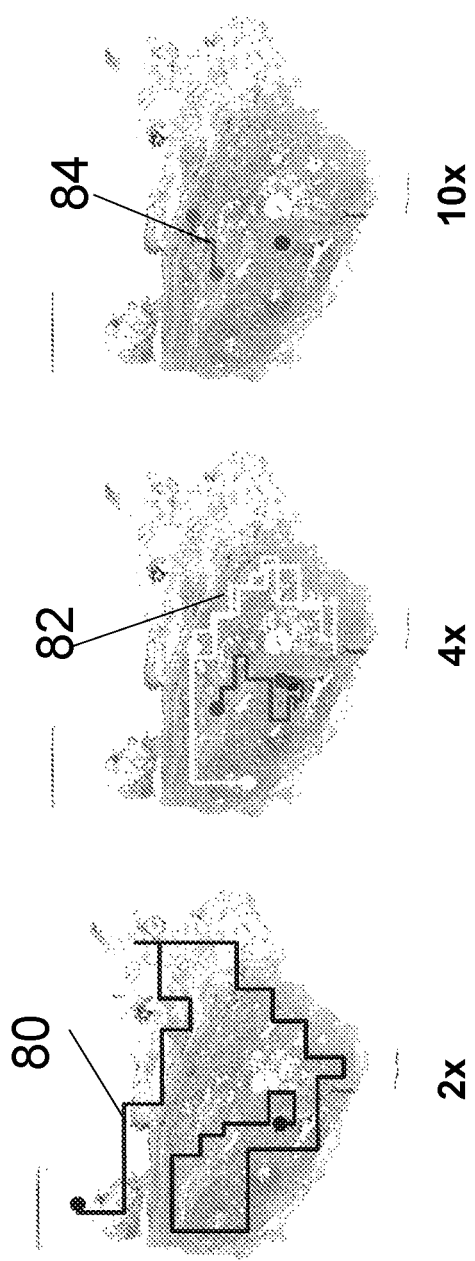
FIG. 9A illustrates a lens path map for a lens providing 2× magnification generated by the system of FIG. 1 in accordance with an embodiment of the present disclosure.
FIG. 9B illustrates a lens path map for a lens providing 4× magnification generated by the system of FIG. 1 in accordance with an embodiment of the present disclosure.
FIG. 9C illustrates a lens path map for a lens providing 10× magnification generated by the system of FIG. 1 in accordance with an embodiment of the present disclosure.
Figure 10:
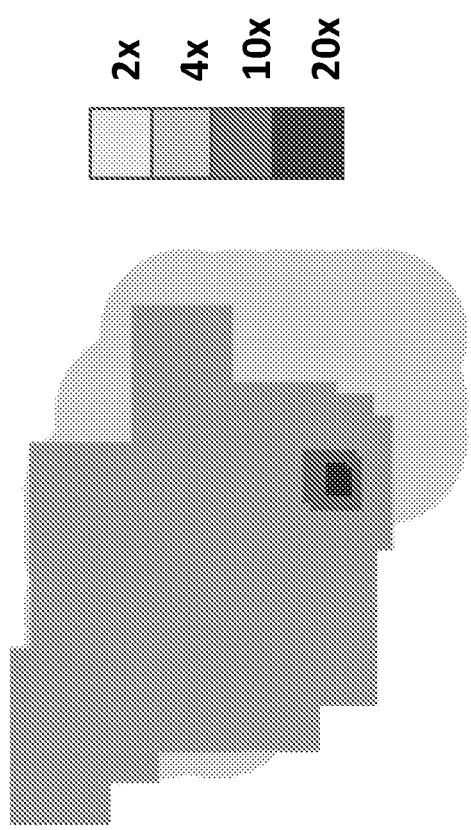
FIG. 10 illustrate a lens resolution map generated by the system of FIG. 1 in accordance with an embodiment of the present disclosure.

In embodiments, the processor executable code may, when executed by the processor of the controller, perform a step of generating path information, wherein the path information includes the first-time stamp, lens information, second time stamp and position information for the plurality of digital images, including those not selected for the first set. In embodiments, the path information does not include the image data. In embodiments, the processor executable code may, when executed by the processor perform a step of storing the path information in the memory 44. In embodiments, the processor executable code may, when executed by the processor, perform a step of generating a path map indicating a path of the objective lenses 18 during the review of the slide S. In embodiments, a separate path map may be indicated for each of the objective lenses 18 and the magnification associated therewith. In embodiments, the path map may be added to or laid over the mosaic image. FIG. 9, for example, illustrates a path map associated with three objective lenses 18 overlaid on a mosaic image. FIG. 9A illustrates a path map 80 associated with a first objective lens providing 2× magnification superimposed over the mosaic image. FIG. 9B illustrates the path map associated with the first objective lens and a path map 82 associated with the second objective lens providing 4× magnification superimposed over the mosaic image. FIG. 9C illustrates the path map 84 associated with the third objective lens providing 10× magnification superimposed over the mosaic image. In embodiments, the path maps 80, 82, 84 may be used to provide feedback to a user to visually illustrate the path of the review over the slide S. In embodiments, the path maps 80, 82, 84 further provide a visual indication of the magnification used at the different positions on the slide during the review of the slide which may be useful in determining whether additional review at other magnifications is appropriate or necessary.

Figure 8:
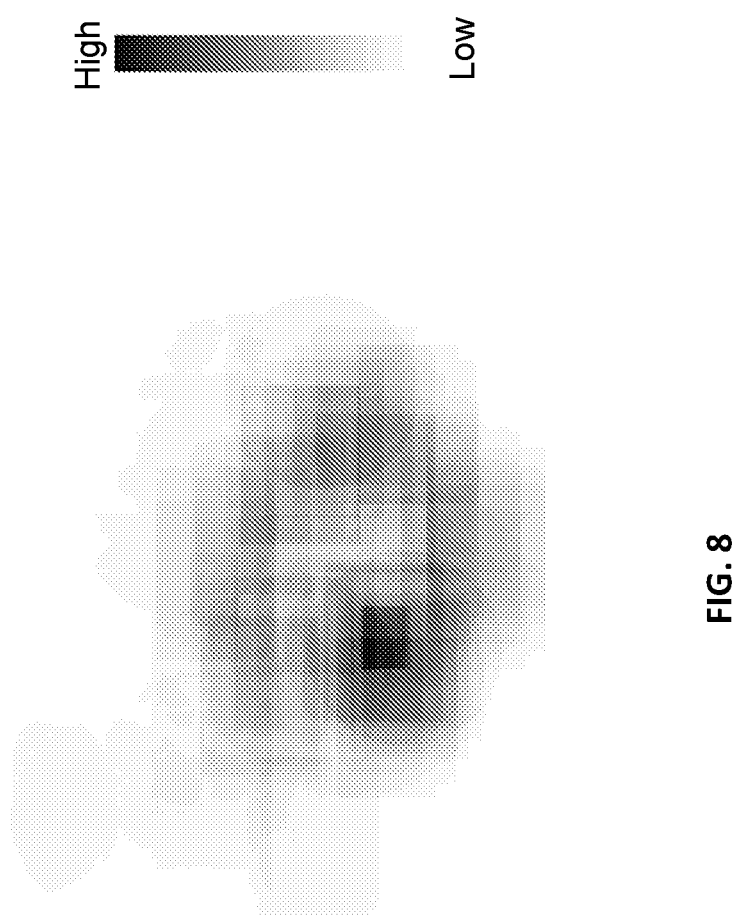
FIG. 8 illustrates a dwell time map generated by the system of FIG. 1 in accordance with an embodiment of the present disclosure.

In embodiments, the processor executable code may, when executed by the processor of the controller 40, perform a step of determining dwell time information associated with positions on the slide S. In embodiments, the dwell time information may be determined based on the second time stamp information and position information to indicate an amount of time spent in the review at each of the positions on the slide S. In embodiments, the processor executable code, when executed by the processor, may generate a dwell time map indicating a duration of time (dwell time) that each portion of slide were viewed. FIG. 8 illustrates an exemplary embodiment of a dwell time map in which darker colors indicate areas of higher dwell time. In embodiments, the dwell time map may provide feedback for the user to provide a visual indication of the areas of the slide that were looked at most closely during the review. In embodiments, the dwell time information may be used to generate training sets of data for use in training machine learning algorithms.

In embodiments, the processor executable code may, when executed by the processor of the controller, perform a step of determining resolution map information associated with positions on the slide. In embodiments, the resolution map information indicates a magnification provided at the positions on the slide. In embodiments, the resolution map information may be based on the lens information and the position information. In embodiments, the processor executable code, may when executed by the processor of the controller, perform a step of generating a resolution map indicating the magnification used at different portions of the slide. In embodiments, the resolution map may be superimposed over the mosaic image. FIG. 7 illustrates an exemplary resolution map. In embodiments, separate resolution maps may be generated for each respective magnification or objective lens. In embodiments, FIG. 7A illustrates an exemplary resolution map associated with a respective objective lens providing 2× magnification. FIG. 7B illustrates another exemplary resolution map associated with the objective lens providing 4× magnification and resolution. FIG. 7C illustrates another exemplary resolution map associated with the objective lens providing 10× magnification. In embodiments, the resolution maps provide feedback to a user to provide a visual indication of the portions of the slide that were reviewed and at which magnification.

In embodiments, the processor executable code may, when executed by the processor, perform a step of generating instructions for use in controlling the digital camera 30. In embodiments, this may include determining an amount of movement of the slide S relative to the objective lens 18. In embodiments, determining the movement of the slide S may include determining a relative speed of the slide and may be accomplished using the position information. In embodiments, relative motion of the slide S may also be determined based on matching keyfeatures as noted above since movement of the slide will affect the position of the keyfeatures in successive images. In embodiments, the more movement or the higher the speed of movement of the slide S, the higher the sampling rate of the digital camera 30 should be set to avoid blurring and to maintain focus. In embodiments, where there is little movement of the slide, or where the slide is moving slowly, the sampling rate of the digital camera may be reduced or may simply stay at a base rate since the danger of blurring is minimal. In embodiments, adjusting the sampling rate of the digital camera based on slide movement allows for gathering sufficient image data to create a complete image of the slide without unnecessarily gathering redundant information. In embodiments, the controller 40 may send the camera sampling rate instructions to the digital camera 30 via the same high-speed bus 38 used to receive the image information at the controller 40. In embodiments, the digital camera 30 may include an onboard camera processor that may be used to control the image sensor 36 and set the desired sampling rate.

In embodiments, the instructions provided by the controller 40 to the camera controller may include instructions to activate or deactivate the digital camera 30. In embodiments, the processor executable code may, when executed by the processor of the controller, perform a step of receiving user proximity information indicating a position of the user relative to the microscope 10, and specifically a position of the user's eye or head relative to the eyepiece 24. In embodiments, the controller 40 may provide activation instructions to the digital camera 30 to activate the digital camera to provide the image information when a user is viewing the slide using the microscope 10. In embodiments, the user position information indicates that a user is in position to view the slide S via the eyepiece 24. In embodiments, the user proximity information may be provided by a second digital camera C positioned to provide images of a user of the microscope 10 which may be used by the controller 40 to determine a position of the user relative to the microscope. In embodiments, the user proximity information may be provided or based on the proximity alert provided by the sensor 50. In embodiments, the second digital camera C may be used in place of, or with the sensor 50. When a user is proximate to the microscope 10, the controller 40 may generate an instruction to activate the digital camera 30 to provide the image information. When no user is present or is not sufficiently close to view the images provide by the microscope 10, the controller 40 may provide an instruction to deactivate the camera 30.

In embodiments, the user may view and evaluate the mosaic image and/or the maps discussed above to determine sufficiency of the review of the slide S. In embodiments, the user may determine that there are portions of the slide S that have not been reviewed or that have not been reviewed for a sufficient time or at a sufficient magnification. In embodiments, the user may then begin the review process again to update the review, and to provide an updated mosaic image. In embodiments, the user may enter an update request to the controller 40. In embodiments, the update request may be provided via the remote device 70 which may be used to view the mosaic image and/or the maps discussed above. In embodiments, the computer executable code may when executed by the processor of the controller 40 issue an activation instruction to activate the camera 30 again as the user update their review. The camera 30 will then provide second image information to the processor 40 which may be processed in the manner described above to provide a second mosaic image. In embodiments, the processor executable code may when executed perform a step of combining the first mosaic image and the second mosaic image into a single mosaic image. In embodiments, the joining of the mosaic images may be accomplished using the matching algorithm discussed above, for example and may also be based on focus level, magnification level etc. In embodiments, the maps discussed above may also be updated using the second image information.

Figure 4:
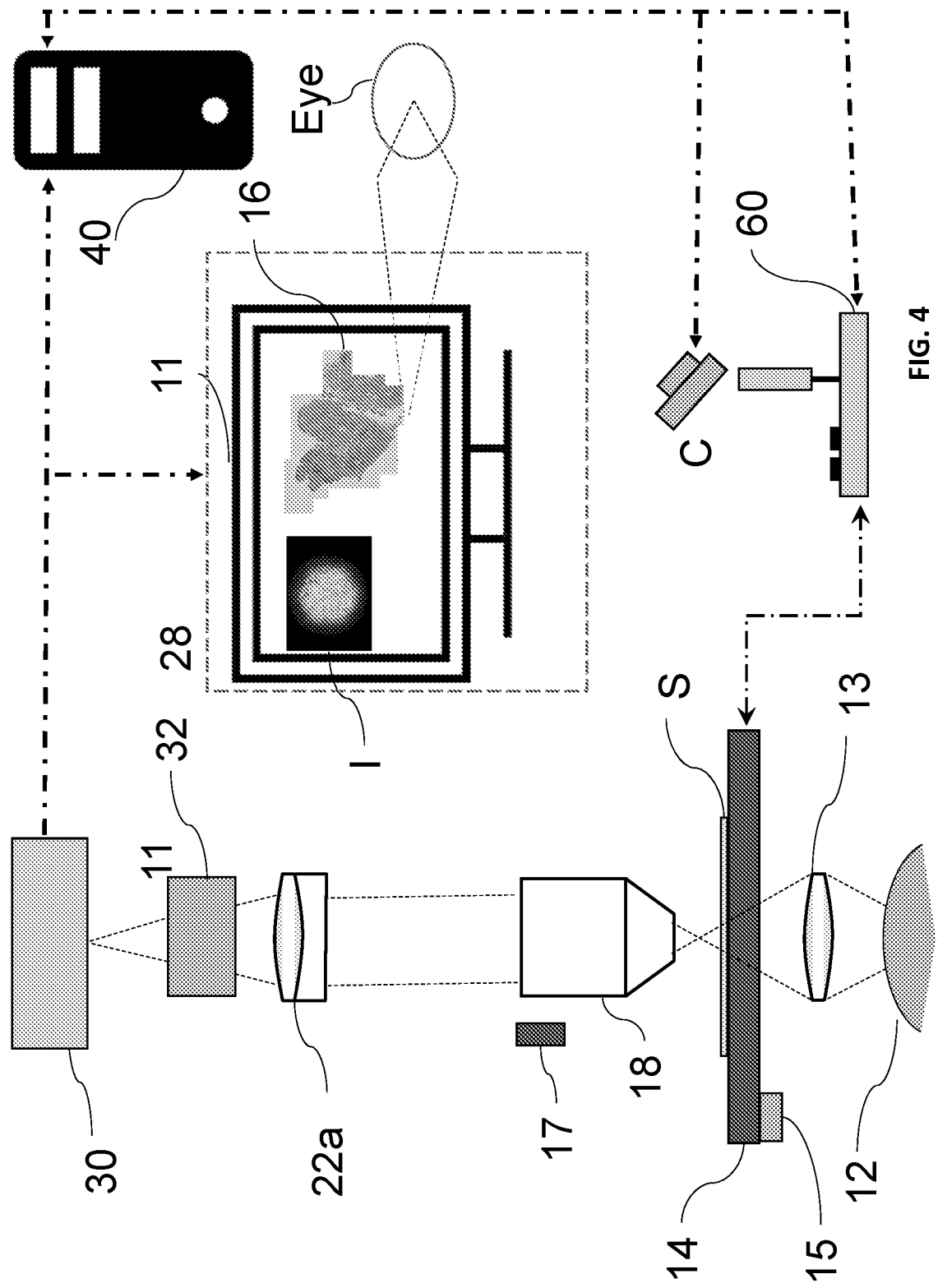
FIG. 4 illustrates an exemplary schematic illustration of the system of FIG. 1 in accordance with an embodiment of the present disclosure.
Figure 5:
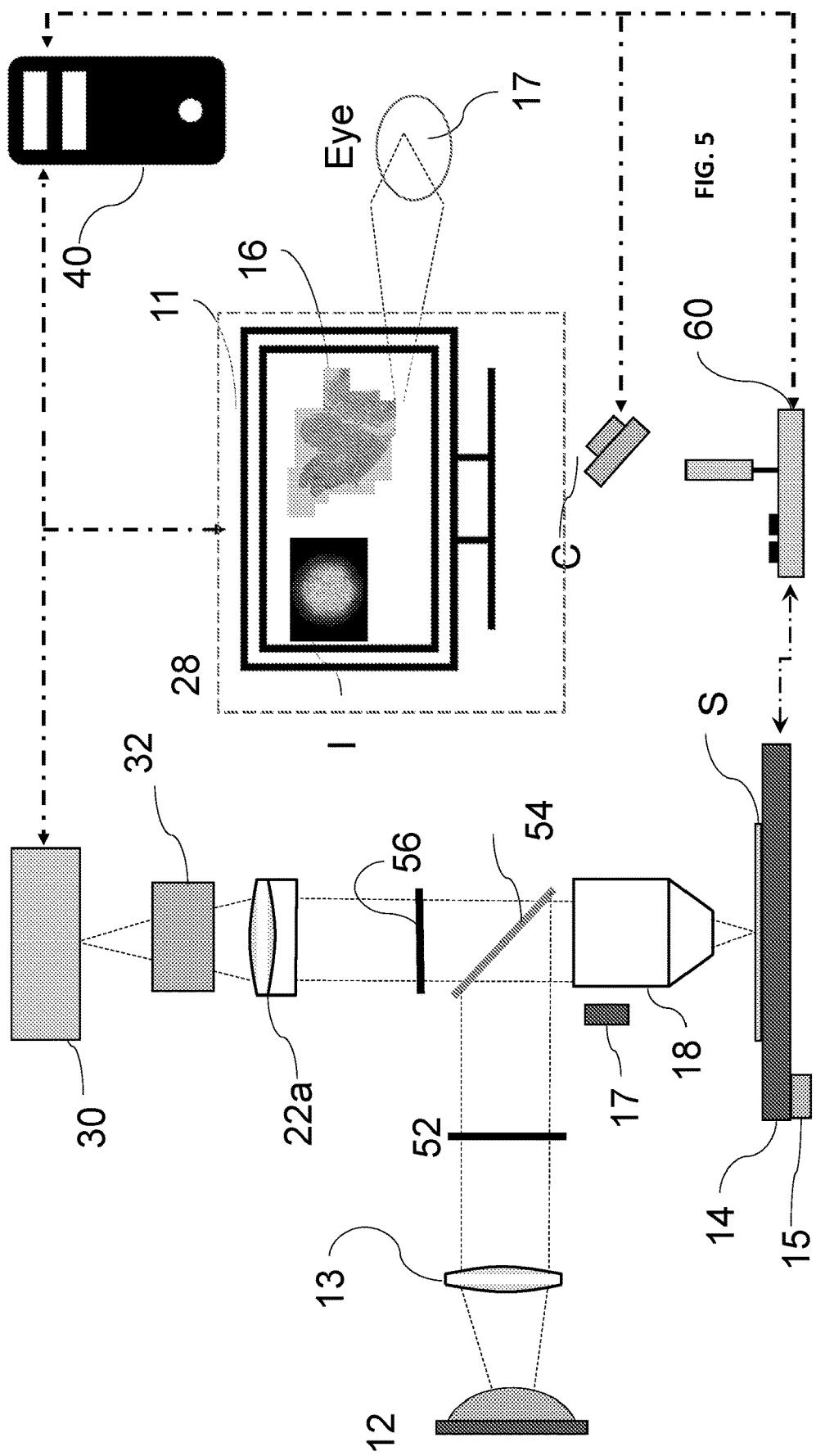
FIG. 5 illustrates an exemplary schematic illustration of the system of FIG. 1 in accordance with an embodiment of the present disclosure.

In embodiments, where the microscope 10 does not include an eyepiece 24, for example, in the microscopes 10 illustrated in FIGS. 4 and 5, the user may view images provided by the objective lenses 18 via the user visual system 28. In embodiments, the user visual system 28 may include a display element 11 that may be used to display the image I provided by the objective lens 18. In embodiments, this image may be provided by the digital camera 30, for example. In embodiments, movement of the stage 14 may be controlled by a user using the joystick 60 shown in FIGS. 4 and 5, for example. In embodiments, other input devices may be used to control movement of the stage 14, including a keyboard or a mouse, to name a few. In embodiments, the movement information provided by the joystick 60 or other input device may be used to provide or determine position information indicating the position of the objective lens 18 relative to the slide S. In embodiments, the display 11 on which the image is provided may be a display operably connected to the controller 40 or directly to the digital camera 30.

In embodiments the system 100 may include at least one of a brightfield, polarization, fluorescence, darkfield, or reflectance microscope. In embodiments, the digital camera 30 may be integrated into or otherwise connected to the microscope and configured to capture images visible via the objective lens of the microscope.

FIG. 2 illustrates a microscope 10 including light source 12, which may be a light emitting diode (LED), halogen lamp, or any other suitable light source. In embodiments, a specimen to be examined may be mounted in the slide S which may be supported on the stage 14. In embodiments, light from the light source 12 may be projected through a collecting lens 13 and then through the slide S. In embodiments, multiple the objective lenses 18 may be mounted on a turret or otherwise movably mounted to allow for different magnification levels, for example, 4×, 10×, and 20× objective lenses, however, other magnifications may be used as discussed above. The image of the slide S may be magnified via one of the objective lenses 18. In embodiments, the beamsplitter 19 may be mounted after the objective lenses such that the magnified image from the objective lens may be provided to both the ocular portion 20, including the eyepiece 24 and to the digital camera 30. In embodiments, a stage movement sensor 15 may be connected to or integrated into the stage 14. In embodiments, the stage movement sensor 15 may be or may include a gyroscope, an accelerometer, magnetic or optical encoders, etc. to name a few. In embodiments, the stage movement sensor 15 and may provide movement information associated with movement of the stage 14 and/or the slide S. In embodiments, a lens sensor 17 may be provided in the microscope 10 and may be configured to provide lens identification information which may indicate a specific objective lens (4×, 10×, or 20× objective lenses) that is currently in use. In embodiments, a proximity sensor 50 may be provided in or near the eyepiece 24 and may provide a proximity alert indicating that a user's face is at or near the eyepiece. In embodiments, a second digital camera C may be directed toward the user and used to determine the proximity of the user or the user's face to the eyepiece. As noted above, this information may be used to generate instructions to activate the digital camera 30 when the user is at or near the eyepiece and to deactivate the digital camera when the user is not near the eyepiece 24. The image of the slide is provided by the beamsplitter 19 to the tube lens 22a and then to the eyepiece 24. In embodiments, the beamsplitter 19 also provides the image to the tube lens 22b and then to the adapter 32 which provides the image to the image sensor 36 of the digital camera 30.

In embodiments, the microscope 10 of FIG. 2 may not include the eyepiece 24 in which case the tube lens 22b may not be necessary. FIG. 4 illustrates the microscope 10 of FIG. 2 in in which the image is viewed on a display element 11 of a user visualization system 28. In embodiments, the display element 11 illustrates both the digital image I of the image provided by the objective lenses 18 as well as the mosaic image 16 which is generated by the controller 40.

Figure 3:
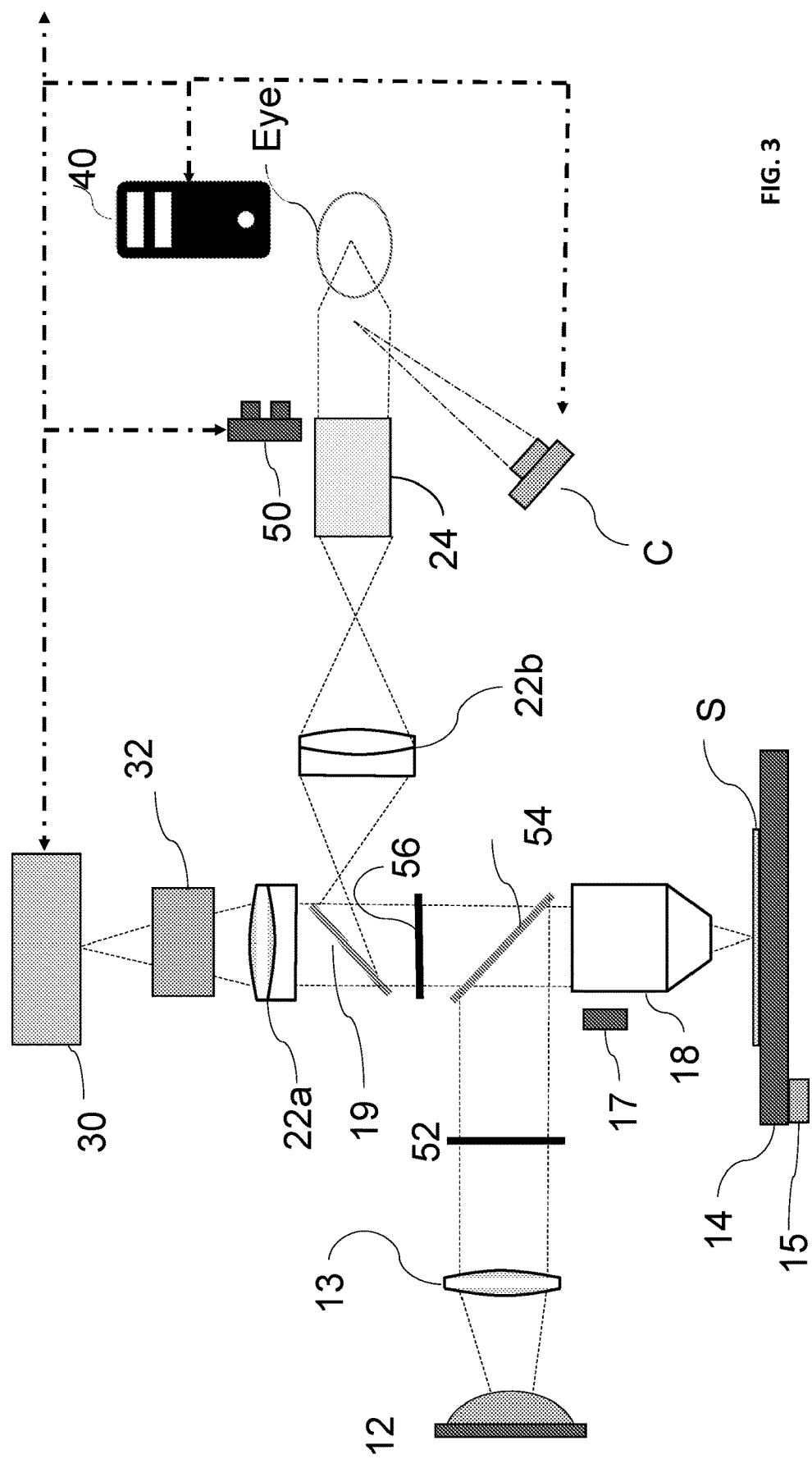
FIG. 3 illustrates an exemplary schematic illustration of the system of FIG. 1 in accordance with another embodiment of the present disclosure.

FIG. 3 illustrates an exemplary embodiment of the system 100 using an epi-illumination based microscope 10. In embodiments, the microscope 10 of FIG. 3 may include a light source 12, which may be similar to that described above with respect to FIG. 2. Light from the light source 12 passes through collecting lens 13 and through to a fluorescence excitation wavelength filter 52 and then to dichroic mirror 54. From there certain wavelengths of light are reflected down to the stage 14 on which the slide S is mounted. Reflected wavelengths from the slide are provided to the fluorescence emission wavelength filter 56 via the objective lens 18 and then to the beamsplitter 19 which provides one image to the tube lens 22b and then to the eyepiece 24 for viewing by a user. The beamsplitter 19 provides a second image to the tube lens 22a and then to the adaptor 32 and the image sensor 36 of the digital camera 20. The proximity sensor 50 and/or camera C may be provided to detect the presence of a user or a user's head at or near the eyepiece 24 in a manner similar to that described above.

FIG. 5 illustrates another example of the system 100 using an epi-illumination based microscope that does not include an eyepiece 24 such that the tube lens 22b may not be used. In embodiments, where no eyepiece is used the image provide by the objective lens 18 may be provided by the digital camera and viewed on the display 11 of the user visualization device 28 discussed above.

In embodiments, as noted above, the image information provided by the digital camera 30 may be used for real-time or near real-time mosaic image generation. In embodiments, the system and method of the present invention provides image information regardless of the objective lens 18 used and automatically handles retention of the best-focus images for mosaic generation as the first set of digital images. In embodiments, the system and method of the present invention provides a record of the portions of the slide viewed with the microscope including magnification (lens) information, sequence (timing) information, and duration (dwell time) information of view of captured images. In embodiments one or more additional digital cameras may be used in combination with a beamsplitter 19 and imaging may be provided in multiple colors.

In embodiments, the method and system of the present invention also make possible an optimal sample of a slide S using novel variable resolution image technology to provide the mosaic image while maximizing the ratio between data size and useful information content. As noted above, in the selecting step, the first set of digital images are selected to cover the slide, maximize quality and minimize overlap which solves the technical problem of conventional slide scanning system which simply scan the slide at a single resolution which is inefficient. In embodiments, the method and system of the present invention provide a single mosaic digital image that contains the desired level of resolution for each region of the slide image.

In embodiments, the method and system of the present invention utilizes a variable resolution mosaic image to provide seamless visualization of optimally-sampled slide images based on the image information provided by the digital camera 30. This approach allows the image information to be stitched into mosaics images at multiple resolution scales in real-time or near real-time. In certain embodiments, the present invention discloses methods for global registration of multiple mosaics across resolution scales into a single data-efficient variable resolution image. For example, as noted above, separate mosaic images may be provided for each magnification provided by the objective lenses 18 and may then be stitched together into a single mosaic image.

In embodiments, the method and system of the present invention provides dynamic recovery of resolution and focus in areas of a slide that are sampler at low-resolution or out of focus. In embodiments, the image information may be used to develop machine learning approaches to dynamically recovering resolution or focus. In embodiments, slides imaged using the method and system of the present invention may be sampled using the same regio-selective levels of resolution that were used by pathologists to make a diagnosis. In certain embodiments, the present invention discloses novel same-domain transfer learning approaches to dynamically recover resolution in areas of the slide sampled at low-resolution, using high-resolution-low-resolution pairs from the slide image to complete final stages of model training.

In embodiments, the method and system of the present invention may be used to generate cumulative maps of the pathologist's or other user's microscope slide interaction pattern to determine desired magnification levels for each slide including the maps illustrated in FIGS. 7-9 and discussed above.

In embodiments, the method and system of the present invention provides a visualization tool that may be provided via the CPU 42 of the controller and or the CPU of the remoted device 70, for example, that allows user interaction with a viewing history as indicated by the mosaic image, for example, to be studied for particular windows of time, for instance reflecting different diagnostic tasks that pathologists perform in sequence when reviewing a slide.

In embodiments, the colors and brightness of images used to make the mosaic image may be equalized. In embodiments, mosaics from the 20× objective, for example, may be darker than those of the 2× objective because the smaller lens lets in less light. In embodiments, where a microscope with a halogen bulb is used, the light may appear to flicker in the video recording, depending on frame rate of the camera 30. In embodiments, mosaic generation may be robust enough to handle any camera settings or light conditions in order to generate the seamless variable resolution visualizations.

In embodiment, the image information may be used to develop a microscope 10 with an automated stage 14 that may reduce some challenges with mosaic generation. In embodiments, hardware encoders and/or spatial coordinates such as the position information provided by the sensor 15 may be recorded to minimize data collection for mosaicking and may provide spatial relationship information between separate mosaics. In embodiments spatial coordinates may be mapped to a low-resolution image, that may be used to guide whole slide imaging if needed. In embodiments machine learning may be used to allow for recovering resolution. In embodiments, the digital camera 30 may include a global reset shutter to avoid motion blur. In embodiments, strobed LED illumination may be used to effectively reduce exposure time and "stop the motion" of the slide can be utilized.

In embodiments, focus is controlled by the pathologist or other user as they review the slide S in real-time, and in areas where fine image detail and resolution are needed to make a diagnostic decision, the user will optimize focus. In embodiments, as noted above, the set of images used to generate the mosaic image selects images, at least in part, based on the best focus level.

In embodiments, a user may quickly "scan" across some areas of the slide at high-speed looking for a particular feature, processing large amounts of visual information at once to detect specific structural or color features, but mostly disregarding fine image detail. As a consequence, in embodiments, the focus of the image in these areas (what we term "transit" areas) is not always optimized by the user. Accordingly, we determined that it is useful to optimize hardware to ensure that the sampling rate is high enough to avoid blur due to motion in transit areas, but if blur due to focus in these areas exists, it could affect the seamless appearance of the final image.

In embodiments, the method and system of the present invention may use a super-resolution generative adversarial network (SRGAN) for resolution recovery.

FIGS. 12-A to 12-H illustrate exemplary flow charts for providing real-time mosaic generation based on microscope review of a slide S in accordance with embodiments of the present disclosure. These figures outline the steps used in an exemplary method for capturing images during review of a microscope slide S using the system 100 discussed above.

Referring to FIG. 12-A, in embodiments, the method may begin at step S1202, by receiving, by the controller 40 from a digital camera 30, first image information. In embodiments, as noted above, the first image information includes image data as well as a time stamp and is provided by the digital camera 30. In embodiments, the method may continue with S1204 where the controller 40 receives from the microscope, lens information, which indicates which objective lens 18 is currently in used and includes another time stamp. In embodiments, the method may then continue at S1206 with capturing, by the controller 40, a plurality of digital images based on the first image information and the corresponding time stamp included therein.

Referring now to FIG. 12-B, in embodiments, the method may continue at step S1208 with a step of storing, by the controller 40, the plurality of digital images and the lens information in memory operably connected to the processor of the controller 40. In embodiments, the method may then continue at step S1210 with selecting, by the controller 40, a first set of digital images from the plurality of digital images for inclusion in a mosaic image. In embodiments, the first set of digital images may include at least a first digital image associated with the first objective lens, at least a second digital image associated with the second objective lens and at least a third digital image associated with the third objective lens.

Referring to FIG. 12-B1, in embodiments, the step S1210 may include sub-steps S1210A-1 and S1210A-2. In embodiments, as part of step S1210A-1, in embodiments, the selecting may include determining a respective focus level for each digital image of the plurality of digital images. In embodiments, in step S1210A-2, the selecting may include comparing the respective focus level of each digital image to a threshold focus level, wherein respective digital images with a focus level below the threshold focus level are not selected for the first set of digital images. In embodiments, referring now to FIG. 12-B2, the selecting step S1210 may include a sub-step S1210B. In embodiments, the step S1210B may include identifying keyfeatures in each digital image of the plurality of images wherein respective digital images with fewer than a threshold number of keyfeatures are determined to be of poor quality and are not selected for the first set of digital images. In embodiments, step S1210 may include all of steps S1210A-1, S1210A-2 and S1210B, some of these steps or a combination thereof.

Referring back to FIG. 12-B, in embodiments, the method may proceed from step S1210 to step S1212 which includes generating, by the controller 40, a mosaic image using the first set of digital images and including at least the first digital image, the second digital image and the third digital image. In embodiments, the mosaic image may be generated such that the mosaic image includes digital images of a first magnification, second magnification and third magnification.

In embodiments, referring now to FIG. 12-B3, the generating step S1212 of FIG. 12-B may include step S1212A which includes generating a whole or partial mosaic image. Referring now to FIG. 12-B4, the generating step S1212 may include step S1212-B, which includes matching at least the first digital image and at least one of the second digital image and the third digital image using a matching algorithm.

FIG. 14A and FIG. 14B illustrates an exemplary flow chart depicting a matching algorithm which may be used in embodiments of the present disclosure. Referring to FIG. 14A, the matching algorithm may begin at step S1402 by identifying a first keyfeature in the first digital image. In embodiments, the matching algorithm may then proceed to step S1404 by identifying a second corresponding keyfeature in the second digital image. In embodiments, the algorithm may proceed with step S1406 by estimating a match value between the first keyfeature and the second keyfeature. In embodiments, at step S1408, the algorithm may proceed by generating a first transformation matrix based on the first keyfeature and the second keyfeature. In embodiments, the algorithm may then proceed with step S1410 by identifying a third keyfeature in the second digital image. In embodiments, the algorithm may next proceed with a steps S1412 by identifying a fourth corresponding keyfeature in the third digital image.

Referring now to FIG. 14-B, in embodiments, the algorithm may proceed from step S1412 to step S1414 which includes estimating a match value between the third keyfeature and the fourth keyfeature. In embodiments, the matching algorithm may then proceed with step S1416 including generating a second transformation matrix based on the third keyfeature and the fourth keyfeature. In embodiments, the algorithm may then proceed with step S1418 including stitching the first digital image to the second digital image based on the first transformation matrix and the second digital image to the third digital image based on the second transformation matrix.

Referring back to FIG. 12-B, in embodiments, the method may continue from step S1212 to S1214 which includes storing, by the controller 40, the first set of digital images in the memory operably connected to the controller 40. In embodiments, the method may be complete. In embodiments, the method may continue with steps S1216A in which the mosaic image is displayed on a display operatively connected to the controller 40 and/or step S1216B in which the mosaic image may be displayed on a remote display element as depicted in FIG. 12-C. In embodiments, step S1216A and step S1216B may take place concurrently, consecutively, in the alternative, or not at all.

In embodiments, as indicated in FIG. 12-C1, the step S1216B may include a step S1216B-1 which includes receiving a remote request to view the mosaic image. In embodiments, such a request may be received via an internet connection from a remote device. In embodiment, step S1216B-1 may be followed by S1216B-2 which includes displaying the mosaic image on a remote display.

In embodiments, from FIG. 12-B, the method may continue with step S1216C (see FIG. 12-D) in which the first image information and lens information for all of the digital images in the plurality of digital images may be stored in memory. In embodiments, from FIG. 12-B, the method may continue with step S1216D which includes generating path information indicating a path of the objective lenses across the microscope slide during the review as indicated in FIG. 12-E.

Figure 13:
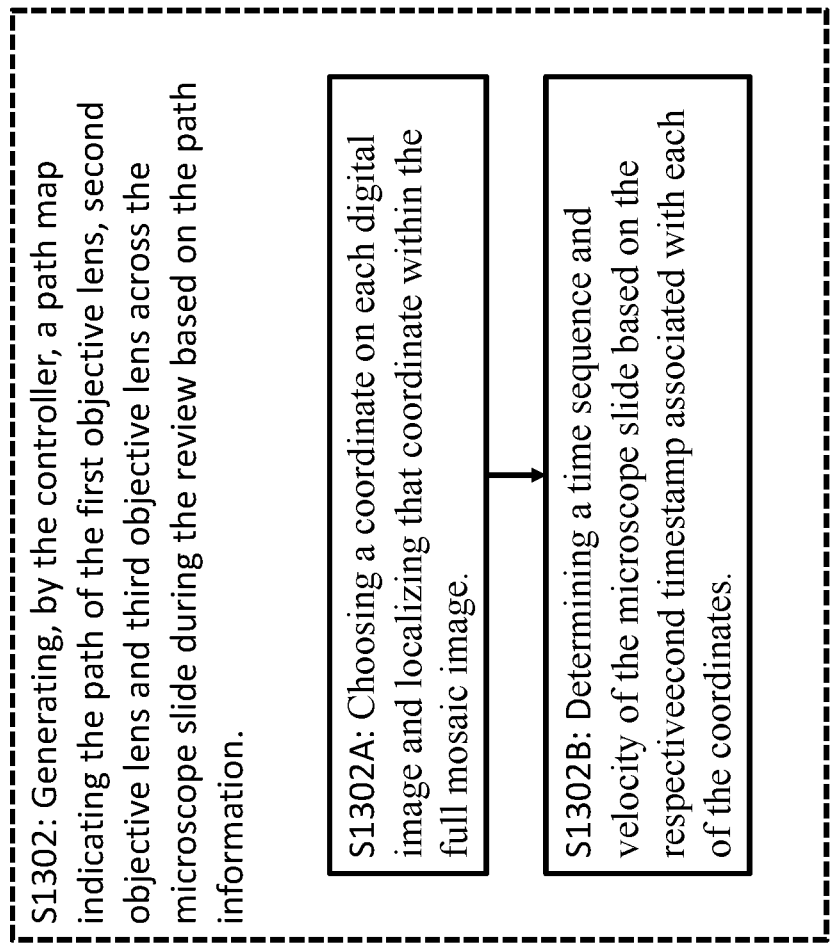
FIG. 13 illustrates an exemplary flow chart of an algorithm used to generate a path map in accordance with an embodiment of the present disclosure.

In embodiments, a path map may be generated based on the path information. Referring to FIG. 13, in embodiments this process may begin at step S1302 by generating, by the controller 40, a path map indicating the path of the first objective lens, second objective lens and third objective lens across the microscope slide during the review based on the path information. In embodiments, step 1302 may or may not include steps S1302A and S1302B. In embodiments, step 1302 may begin with step S1302A which includes choosing a coordinate on each digital image and localizing that coordinate within the full mosaic image. In embodiments, step S1302A may be followed by step S1302B in which a time sequence and velocity of the microscope slide S may be determined based on the respective second timestamp associated with each of the coordinates included in the image information.

Referring now to FIG. 12-F1, in embodiments, the method may also proceed from FIG. 12-B with step S1218 including receiving, by the controller, an update instruction from a user or from a third party. In embodiments the update instruction may be entered by a user using an input device operatively connected to the controller 40, such as a keyboard or mouse, for example. In embodiments, a display operatively connected to the controller 40 may be a touchscreen which allows the input of information including an update request or a request for an update request. In embodiments, the method may then proceed at step S1220 by receiving, by the controller from the digital camera, second image information. In embodiments, the second image information may be provided based on a second review or an updated review of the slide S using the microscope 10. In embodiments, the method may continue to step S1222 including receiving, by the controller from the microscope, second lens information associated with the second image information which indicates the objective lens 18 in use, and thus the magnification associated with the image data included in the second image information. In embodiments, the method will continue with step S1222 in which the controller 40 captures a second plurality of digital images based on the second image information in a manner similar to that described above with respect to the first image information. In embodiments, the method may continue with S1226 in which the controller 40 may store the second plurality of digital images and the second lens information in the memory. Referring to FIG. 12-F2, in embodiments the method may next continue with step S1228 which includes selecting, by the controller, a second set of digital images from the second plurality of digital images for inclusion in the mosaic image. In embodiments, the method may then continue with step S1230 by updating, by the controller, the mosaic image to include at least a portion of the second set of digital images. The method may next continue with step S1232 by storing, by the controller, the second set of digital images in the memory. In embodiments, the updating step S1230 may include generating a second mosaic image based on the second set of digital images and combining the first mosaic image and the second mosaic image to provide the updated mosaic image.

Referring now to FIG. 12-G, in embodiments, the method may then proceed to step S1234 which includes generating, by the controller, at least one resolution map indicating pixels associated with each of the first objective lens, the second objective lens and the third objective lens. In step S1236, the method may then proceed with generating, by the controller, at least one dwell time map indicating a duration of time (dwell time) each image or pixel in each image of the first set of digital images included in the mosaic image was viewed during the review of the slide. In embodiments, the method may next proceed with step S1238 by generating, by the controller, a path map indicating a respective path of the objective lenses during the review of the microscope slide.

Referring now to FIG. 12-H, in embodiments, the method may then proceed to step S1244 or may terminate or repeat. In embodiments, step S1244 includes obtaining, at the controller, position information indicating movement of the microscope slide S relative to the first objective lens, second objective lens and third objective lens. At step S1246, in embodiments, the method may then proceed by generating, by the controller, an instruction to change the sampling rate or frame rate of the digital camera based on movement of the microscope slide S. In embodiments, the method may continue at step S1248 by sending, by the controller to the digital camera, the instruction to change the sampling rate of the digital camera. In embodiments, the method may then terminate or repeat, in part or in whole.

It is understood that the examples and embodiments described herein are for illustrative purposes only and that various modifications or changes in light thereof will be suggested to persons skilled in the art and are to be included within the spirit and purview of this application and scope of the appended claims. Further, it is understood that examples and embodiments described herein with reference to a pathologist or pathologist workflow do not limit the scope of the appended claims and instead are illustrative of examples and embodiments applicable to other clinical viewers of slides and slide review workflows. All publications, patents, and patent applications cited herein are hereby incorporated by reference in their entirety for all purposes.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed:

1. A system for capturing images during review of a microscope slide comprising:
   (a) a microscope including a stage configured to support the microscope slide, a first objective lens providing a first magnification, a second objective lens providing a second magnification, a third objective lens providing a third magnification and a lens indicator sensor, wherein the microscope slide is movable relative to the first objective lens, the second objective lens and the third objective lens; and wherein the lens indicator sensor is configured to provide lens information indicating whether the first objective lens, the second objective lens or the third objective lens is in use and including a first time stamp;

(b) a digital camera operably connected to the microscope and configured to provide image information associated with images provided via the first objective lens, the second objective lens and the third objective lens during review of the microscope slide, wherein the image information includes:
(1) image data; and
(2) a second time stamp associated with a time at which such image data was generated by the digital camera;

(c) a controller operably connected to the digital camera and the microscope, wherein the controller includes:
at least one processor; and
memory operably connected to the controller and including processor executable code that when executed performs steps of:
(1) receiving, by the controller from the digital camera, the image information;
(2) receiving, by the controller from the microscope, the lens information;
(3) capturing, by the controller, a plurality of digital images based on the image information and the second time stamp;
(4) storing, by the controller, the plurality of digital images and the lens information in the memory;
(5) selecting, by the controller, a first set of digital images from the plurality of digital images for inclusion in a mosaic image, wherein the first set of digital images includes at least a first digital image associated with the first objective lens, at least a second digital image associated with the second objective lens and at least a third digital image associated with the third objective lens, wherein the selecting is based on the image information and the lens information;
(6) generating, by the controller, a mosaic image using the first set of digital images and including at least the first digital image, the second digital image and the third digital image so that the mosaic image includes digital images of the first magnification, second magnification and third magnification,
wherein the generating includes:
matching at least the first digital image and at least one of the second digital image and the third digital image using a matching algorithm;
(7) storing, by the controller, the first set of digital images in the memory;

wherein a respective digital image of the plurality of digital images is associated with at least two objective lenses and at least two magnifications.

2. The system of claim 1, wherein the first magnification is 4× magnification, the second magnification is 10× and the third magnification is 20×.

3. The system of claim 1, wherein the slide is movable on the stage relative to the first objective lens, the second objective lens and the third objective lens.

4. The system of claim 1, wherein the stage is movable with the slide relative the first objective lens, the second objective lens and the third objective lens.

5. The system of claim 4, further comprising a position sensor device operably connected to the stage and configured to provide position information, the position information including:
position data indicating a position the microscope slide relative to the first objective lens, second objective lens and third objective lens; and
a third time stamp.

6. The system of claim 1, wherein the selecting step includes:
determining a respective focus level for each digital image of the plurality of digital images; and
comparing the respective focus level of each digital image to a threshold focus level;
wherein respective digital images with a focus level below the threshold focus level are not selected for the first set of digital images.

7. The system of claim 1, wherein the selecting step includes identifying keyfeatures in each digital image of the plurality of images wherein respective digital images with fewer than a threshold number of keyfeatures are determined to be of poor quality and are not selected for the first set of digital images.

8. The system of claim 1, wherein the matching algorithm includes:
identifying a first keyfeature in the first digital image;
identifying a second corresponding keyfeature in the second digital image;
estimating a match value between the first keyfeature and the second keyfeature;
generating, a first transformation matrix based on the first keyfeature and the second keyfeature;
identifying a third keyfeature in the second digital image;
identifying a fourth corresponding keyfeature in the third digital image;
estimating a match value between the third keyfeature and the fourth keyfeature;
generating, a second transformation matrix based on the third keyfeature and the fourth keyfeature;
and stitching the first digital image to the second digital image based on the first transformation matrix and the second digital image to the third digital image based on the second transformation matrix, and wherein the stitched digital images are included in the mosaic image.

9. The system of claim 1, wherein the memory includes processor executable code that when executed by the at least one processor executes a step of displaying the mosaic image on one of a display operatively connected to the controller and a remote display element.

10. The system of claim 1, wherein the image information comprises one of still images and video.

11. The system of claim 1, wherein the memory includes processor executable code that when executed by the at least one processor executes a step of:
receiving a remote request to view the mosaic image via an internet connection; and
displaying the mosaic image on a remote display element via an internet connection.

12. The system of claim 1, wherein the memory includes processor executable code that when executed by the at least one processor executes steps of:
- (8) receiving, by the controller, an update instruction;
- (9) receiving, by the controller from the digital camera, second image information;
- (10) receiving, by the controller from the microscope, second lens information associated with the second image information;
- (11) capturing, by the controller, a second plurality of digital images based on the second image information;
- (12) storing, by the controller, the second plurality of digital images and the second lens information in the memory;
- (13) selecting, by the controller, a second set of digital images from the second plurality of digital images for inclusion in the mosaic image, wherein the selecting is based on the second image information and second lens information;
- (14) updating, by the controller, the mosaic image to include at least a portion of the second set of digital images;
- (15) storing, by the controller, the second set of digital images in the memory.

13. The system of claim 1, wherein the generating step comprises stitching the first set of digital images together and eliminating redundancy.

14. The system of claim 1, wherein the generating step includes generating a whole or partial mosaic slide image.

15. The system of claim 1, wherein the memory includes processor executable code that when executed by the at least one processor executes a step of storing, by the controller, image information and lens information for all digital images of the plurality of digital images.

16. The system of claim 1, wherein the memory includes processor executable code that when executed by the at least one processor executes steps of:
- (8) generating, by the controller, at least one resolution map indicating pixels associated with each of the first objective lens, the second objective lens and the third objective lens;
- (9) generating, by the controller, at least one dwell time map indicating a duration of time each image of the first set of digital images included in the mosaic image was viewed;
- (10) generating, by the controller, a path map indicating a respective path of the objective lens during the review of the microscope slide.

17. The system of claim 1, further comprising at least one ocular, wherein the at least one ocular is provided downstream of the first objective lens, and the at least one ocular is configured for a user to view images of the microscope slide.

18. The system of claim 17, further comprising a beam splitter positioned between the first objective lens, second objective lens and third objective lens and the ocular, wherein the beam splitter splits the image provided by the first objective lens, second objective lens and third objective lens between the ocular and the digital camera.

19. The system of claim 1, wherein the digital camera includes an image sensor, wherein a size of the image sensor is based on a field of view provided by the first objective lens, second objective lens and third objective lens such that the image sensor is large enough to cover the entire field of view.

20. The system of claim 1, wherein a pixel size of the digital camera is two times smaller than a diffraction limited spot size d provided by the first objective lens, second objective lens and third objective lens wherein:

$$d = \frac{1.22\lambda}{(NA_{obj} + NA_{cond})},$$

where $\lambda$ is the wavelength of light, $NA_{obj}$ is a numerical aperture of a selected objective lens, and $NA_{cond}$ is the numerical aperture of a condenser lens.

21. The system of claim 1, further comprising a proximity sensor configured to provide an alert when a user is positioned to view the slide in the microscope and wherein a sampling rate of the camera increases when the alert is issued.

22. The system of claim 1, wherein the memory includes processor executable code that when executed performs the steps of:
- (8) obtaining, at the controller, position information indicating movement of the microscope slide relative to the first objective lens, second objective lens and third objective lens;
- (9) generating, by the controller, an instruction to change a sampling rate of the digital camera based on movement of the slide; and
- (10) sending, by the controller to the digital camera, the instruction to change the sampling rate of the digital camera.

23. The system of claim 1, wherein the memory includes processor executable code that when executed performs a step of:
- (8) generating, by the controller, path information indicating a path of the first objective lens, second objective lens and third objective lens across the microscope slide during the review, wherein the path information includes:
  - i. position data;
  - ii. lens data; and
  - iii. timing information.

24. The system of claim 23, wherein the path information is based on the plurality of digital images, wherein the path information is stored in the memory.

25. The system of claim 23, wherein the path information includes magnification information associated with each position, wherein the magnification information is based on the lens information.

26. The system of claim 23, wherein the memory includes processor executable code that when executed performs a step of generating, by the controller, a path map indicating the path of the first objective lens, second objective lens and third objective lens across the microscope slide during the review based on the path information.

27. The system of claim 26, wherein the generating step includes:
- i. choosing a coordinate on each digital image and localizing that coordinate within the full mosaic image;
- ii. determining a time sequence and velocity of the slide based on the respective third timestamp associated with each of the coordinates.

28. The system of claim 1, wherein the mosaic image is generated in real time.

29. The system of claim 1, wherein the memory includes processor executable code that when executed by the processor performs a step of storing the mosaic image on a server accessible via the internet.

* * * * *